United States Patent [19]

Tsay et al.

[11] Patent Number: 5,487,165
[45] Date of Patent: Jan. 23, 1996

[54] STANDARD PAGE DESCRIPTION LANGUAGE CLEARTEXT STRUCTURE GENERATOR

[75] Inventors: Donny Tsay; Tetsuro Motoyama, both of San Jose, Calif.

[73] Assignees: Ricoh Company, Ltd., Tokyo, Japan; Ricoh Corporation, San Jose, Calif.

[21] Appl. No.: 147,603

[22] Filed: Nov. 4, 1993

Related U.S. Application Data

[63] Continuation-in-part of Ser. No. 931,808, Aug. 11, 1992, Pat. No. 5,416,896, which is a continuation-in-part of Ser. No. 876,601, Apr. 30, 1992, Pat. No. 5,319,748, and a continuation-in-part of Ser. No. 876,251, Apr. 30, 1992, Pat. No. 5,325,484.

[51] Int. Cl.$^6$ .................................................. G06F 17/22
[52] U.S. Cl. ............................ 395/600; 364/DIG. 1; 364/DIG. 2; 395/118; 395/144; 395/145; 395/148; 395/161; 395/162
[58] Field of Search ........................... 395/600, 145, 395/164–166, 101, 131, 133–134, 144, 145, 147–148, 161–162, 575; 364/DIG. 1, DIG. 2

[56] References Cited

U.S. PATENT DOCUMENTS

| | | | |
|---|---|---|---|
| 4,649,513 | 3/1987 | Martin et al. | 395/149 |
| 4,870,611 | 9/1989 | Martin et al. | 395/147 |
| 4,970,665 | 11/1990 | Doi et al. | 395/148 |
| 5,023,811 | 6/1991 | Donnelly et al. | 395/145 |
| 5,133,051 | 7/1992 | Handley | 395/148 |
| 5,295,236 | 3/1994 | Bjorge et al. | 395/134 |
| 5,319,748 | 6/1994 | Motoyama | 395/162 |
| 5,325,484 | 6/1994 | Motoyama | 395/162 |
| 5,416,896 | 5/1995 | Motoyama | 395/145 |

OTHER PUBLICATIONS

"InterPress, The Source Book" by Harrington et al (Simon and Schuster, Inc., 1988).
"PostScript Language Reference Manual", Addison–Wesley Publishing Co. Second Edition, 1991.
ISO/IEC DIS 10180, Information Processing—Text Communication—Standard Page Description Language; Draft International Standard 1991–03, 1991.

*Primary Examiner*—Thomas G. Black
*Assistant Examiner*—Hosain T. Alam
*Attorney, Agent, or Firm*—Oblon, Spivak, McClelland, Maier & Neustadt

[57] ABSTRACT

A method and apparatus for generating a file which conforms to the requirements of a computer language and does not require the user to type out the desired commands for a file being created. A list of commands is displayed for a user to select and when a user selects a specific command, the user is prompted for additional information concerning the command, if this information is required. The user is given choices of commands or elements which are to appear below the previously selected element or command. A stack is used to keep track of the different elements in a hierarchical structure of the computer language. When an element is first placed into a file being generated, it is pushed onto the stack. As elements below the current element in the hierarchy are being processed, they are pushed on top of the previous elements. When the elements are finished, they are popped off of and elements requiring end-tags which signify the end of the element are then inserted into the generated file.

30 Claims, 47 Drawing Sheets

```
1  <!DOCTYPE SPDL PUBLIC "ISO/IEC 10180//DTD SPDL Instance//EN" >
2  <SPDL>
3    <DOCUMENT>
4      <PICTURE spdlid = "ISO/IEC 10180//SPDL"
5          cntnttyp = "ISO/IEC 10180//ContentType/SPDLCleartext">
6        <PROLOGUE>
7          <DICTGENS>
8            <DICTGEN size = "4">
9              <DICTID>
10               <NAME>
11                 Alpha
12               </NAME>
13             </DICTID>
14             <TOKENSEQ>
15               40 40 moveto
16               120 100 lineto
17             </TOKENSEQ>
18           </DICTGEN>
19         </DICTGENS>
20       </PROLOGUE>
21     </PICTURE>
22   </DOCUMENT>
23 </SPLD>
```

*FIG. 1*

Welcome to Ricoh's SPDL Cleartext File Generator ...

Choice:
1. Create an SPDL Document
2. Create an SPDL External File
3. Start with any SPDL Element
/ Comment ExtID Goto List Save Restore Quit Input -> 1 <CR>

------------ Line Data information
1    <!DOCTYPE SPDL PUBLIC "ISO/IEC 10180//DTD SPDL Instance//EN" >

*FIG. 2A*

Start to create an SPDL document ...

Current Element: <DOCUMENT>    (declaration: none)
Choice:
1. <SPDL> SPDL
/ Comment ExtID Goto List Save Restore Quit Input -> 1 <CR>

------------ Line Data information
1    <!DOCTYPE SPDL PUBLIC "ISO/IEC 10180//DTD SPDL Instance//EN" >
2    <SPDL>

*FIG. 2B*

Current Element: <SPDL>   (declaration: Choice)
Choice:
1. <DOCUMENT>    Document
2. <RESDEF>      Resource Definition
/ Comment ExtID Goto List Save Restore Quit Input -> 1 <CR>

----------- Line Data information
1   <!DOCTYPE SPDL PUBLIC "ISO/IEC 10180//DTD SPDL Instance//EN" >
2   <SPDL>
3     <DOCUMENT>

*FIG. 2C*

Current Element: <DOCUMENT>   (declaration: Choice)
Choice:
1. <PAGESET>   Pageset
2. <PICTURE>   Picture
/ Comment ExtID Goto List Save Restore Quit input -> 2 <CR>

----------- Line Data information
1   <!DOCTYPE SPDL PUBLIC "ISO/IEC 10180//DTD SPDL Instance//EN" >
2   <SPDL>
3     <DOCUMENT>
4       <PICTURE spdlid = "ISO/IEC 10180//SPDL"
5              cntnttyp = "ISO/IEC 10180//ContentType/SPDLCleartext">

*FIG. 2D*

Current Element: <PICTURE>  (declaration: sequence)
Choice:
1. <PROLOGUE> Prologue (optional)
2. <PICBODY>  Picture Body (optional)
/ Comment ExtID Goto List Save Restore Quit Input -> 1 <CR>

------------ Line Data information
1  <!DOCTYPE SPDL PUBLIC "ISO/IEC 10180//DTD SPDL Instance//EN" >
2  <SPDL>
3    <DOCUMENT>
4      <PICTURE spdlid = "ISO/IEC 10180//SPDL"
5          cntnttyp = "ISO/IEC 10180//ContentType/SPDLCleartext">
6        <PROLOGUE>

*FIG. 2E*

Current Element: <PICTURE>  (declaration: sequence)
Choice:
1. <EXTDECLS>  External Declarations (optional)
2. <INFDECL>   Informative Declaration (optional)
3. <RESDEFS>   Resource Definitions (optional)
4. <RESDECLS>  Resource Declarations (optional)
5. <DPIDECLS>  DPI Declarations (optional)
6. <CTXTDECL>  Context Declaration (optional)
7. <DICTGENS>  Dictionary Generators (optional)
8. <SETUPS>    Setup Procedures (optional)
/ Comment ExtID Goto List Save Restore Quit input -> 7 <CR>

------------ Line Data information
1  <!DOCTYPE SPDL PUBLIC "ISO/IEC 10180//DTD SPDL Instance//EN" >
2  <SPDL>
3    <DOCUMENT>
4      <PICTURE spdlid = "ISO/IEC 10180//SPDL"
5          cntnttyp = "ISO/IEC 10180//ContentType/SPDLCleartext">
6        <PROLOGUE>
7          <DICTGENS>

*FIG. 2F*

Current Element: <DICTGENS>   (declaration: none)
Choice:
1. <DICTGEN>     Dictionary Generator (zero or more)
/ Comment ExtID Goto List Save Restore Quit Input -> 1 <CR>

Please input the value for attribute: SIZE (Short Integer)
Attr_Value input -> 4 <CR>

------------ Line Data information
1  <!DOCTYPE SPDL PUBLIC "ISO/IEC 10180//DTD SPDL Instance//EN" >
2  <SPDL>
3    <DOCUMENT>
4      <PICTURE spdlid = "ISO/IEC 10180//SPDL"
5          cntnttyp = "ISO/IEC 10180//ContentType/SPDLCleartext">
6        <PROLOGUE>
7          <DICTGENS>
8            <DICTGEN size = "4">

*FIG. 2G*

Current Element: <DICTGEN>   (declaration: sequence)
Choice:
1. <DICTID>       Dictionary Identifier
2. <TOKENSEQ>     Token Sequence (zero or more)
/ Comment ExtID Goto List Save Restore Quit Input -> 1 <CR>
------------ Line Data information
1  <!DOCTYPE SPDL PUBLIC "ISO/IEC 10180//DTD SPDL Instance//EN" >
2  <SPDL>
3    <DOCUMENT>
4      <PICTURE spdlid = "ISO/IEC 10180//SPDL"
5          cntnttyp = "ISO/IEC 10180//ContentType/SPDLCleartext">
6        <PROLOGUE>
7          <DICTGENS>
8            <DICTGEN size = "4">
9              <DICTID>

*FIG. 2H*

Current Element: <DICTID>  (declaration: none)
Choice:
1. <NAME>          Dictionary Name
/ Comment ExtID Goto List Save Restore Quit Input -> 1 <CR>

Please input "Name" information!
NAME: Alpha<CR>
End of <NAME> input!

------------ Line Data information
1    <!DOCTYPE SPDL PUBLIC "ISO/IEC 10180//DTD SPDL Instance//EN" >
2    <SPDL>
3      <DOCUMENT>
4        <PICTURE spdlid = "ISO/IEC 10180//SPDL"
5            cntnttyp = "ISO/IEC 10180//ContentType/SPDLCleartext">
6          <PROLOGUE>
7            <DICTGENS>
8              <DICTGEN size = "4">
9                <DICTID>
10                 <NAME>
11                   Alpha
12                 </NAME>
13               </DICTID>

*FIG. 21*

Current Element: <DICTGEN>    (declaration: Sequence)
Choice:
1. <TOKENSEQ>    Token Sequence (zero or more)
/ Comment ExtID Goto List Save Restore Quit Input -> 1 <CR>

Start input Token Sequences!
Use "/" to terminate your input!
TokenSeq input -> 40 40 moveto<CR>
TokenSeq input -> 120 100 lineto<CR>
TokenSeq input -> /<CR>
End of Token Sequence input!

Current Element: <DICTGEN>    (declaration: Sequence)
Choice:
1. <TOKENSEQ>    Token Sequence (zero or more)
/ Comment ExtID Goto List Save Restore Quit Input -> / <CR>

---------- Line Data information
1   <!DOCTYPE SPDL PUBLIC "ISO/IEC 10180//DTD SPDL Instance//EN" >
2   <SPDL>
3     <DOCUMENT>
4       <PICTURE spdlid = "ISO/IEC 10180//SPDL"
5             cntnttyp = "ISO/IEC 10180//ContentType/SPDLCleartext">
6         <PROLOGUE>
7           <DICTGENS>
8             <DICTGEN size = "4">
9               <DICTID>
10                <NAME>
11                  Alpha
12                </NAME>
13              </DICTID>
14              <TOKENSEQ>
15                40 40 moveto
16                120 100 lineto
17              </TOKENSEQ>

*FIG. 2J*

Current Element: <DICTGEN>     (declaration: Sequence)
Choice:
1. <TOKENSEQ>     Token Sequence (zero or more)
/ Comment ExtID Goto List Save Restore Quit Input -> / <CR>

---------- Line Data information
1    <!DOCTYPE SPDL PUBLIC "ISO/IEC 10180//DTD SPDL Instance//EN" >
2    <SPDL>
3      <DOCUMENT>
4        <PICTURE spdlid = "ISO/IEC 10180//SPDL"
5            cntnttyp = "ISO/IEC 10180//ContentType/SPDLCleartext">
6          <PROLOGUE>
7            <DICTGENS>
8              <DICTGEN size = "4">
9                <DICTID>
10                 <NAME>
11                   Alpha
12                 </NAME>
13               </DICTID>
14               <TOKENSEQ>
15                 40 40 moveto
16                 120 100 lineto
17               </TOKENSEQ>
18             </DICTGEN>

*FIG. 2K*

Current Element: <DICTGENS>    (declaration: none)
Choice:
1. <DICTGEN>    Dictionary Generator (zero or more)
/ Comment ExtID Goto List Save Restore Quit Input -> / <CR>

------------ Line Data information
1    <!DOCTYPE SPDL PUBLIC "ISO/IEC 10180//DTD SPDL Instance//EN" >
2    <SPDL>
3      <DOCUMENT>
4        <PICTURE spdlid = "ISO/IEC 10180//SPDL"
5            cntnttyp = "ISO/IEC 10180//ContentType/SPDLCleartext">
6          <PROLOGUE>
7            <DICTGENS>
8              <DICTGEN size = "4">
9                <DICTID>
10                  <NAME>
11                    Alpha
12                  </NAME>
13                </DICTID>
14                <TOKENSEQ>
15                  40 40 moveto
16                  120 100 lineto
17                </TOKENSEQ>
18              </DICTGEN>
19            </DICTGENS>

*FIG. 2L*

Current Element: <PROLOGUE>    (declaration: Sequence)
Choice:
1. <SETUPS>    Setup Procedures (optional)
/ Comment ExtID Goto List Save Restore Quit Input -> / <CR>

---------- Line Data information
1   <!DOCTYPE SPDL PUBLIC "ISO/IEC 10180//DTD SPDL Instance//EN" >
2   <SPDL>
3     <DOCUMENT>
4       <PICTURE spdlid = "ISO/IEC 10180//SPDL"
5                cntnttyp = "ISO/IEC 10180//ContentType/SPDLCleartext">
6         <PROLOGUE>
7           <DICTGENS>
8             <DICTGEN size = "4">
9               <DICTID>
10                <NAME>
11                  Alpha
12                </NAME>
13              </DICTID>
14              <TOKENSEQ>
15                40 40 moveto
16                120 100 lineto
17              </TOKENSEQ>
18            </DICTGEN>
19          </DICTGENS>
20        </PROLOGUE>

*FIG. 2M*

Current Element: <PICTURE>   (declaration: Sequence)
Choice:
1. <PICBODY>   Picture Body (optional)
/ Comment ExtID Goto List Save Restore Quit Input -> / <CR>

———————— Line Data information
1   <!DOCTYPE SPDL PUBLIC "ISO/IEC 10180//DTD SPDL Instance//EN" >
2   <SPDL>
3     <DOCUMENT>
4       <PICTURE spdlid = "ISO/IEC 10180//SPDL"
5           cntnttyp = "ISO/IEC 10180//ContentType/SPDLCleartext">
6         <PROLOGUE>
7           <DICTGENS>
8             <DICTGEN size = "4">
9               <DICTID>
10                <NAME>
11                  Alpha
12                </NAME>
13              </DICTID>
14              <TOKENSEQ>
15                40 40 moveto
16                120 100 lineto
17              </TOKENSEQ>
18            </DICTGEN>
19          </DICTGENS>
20        </PROLOGUE>
21      </PICTURE>
22    </DOCUMENT>
23  </SPLD>

THE SPDL FILE HAS BEEN GENERATED!

Please input a file name to store it (default is "spdlgen.doc"): <cr>
SPDL file "spdlgen.doc" is created!

*** Good-Bye! Welcome to use Ricoh's SPDL File Generator again! ***

*FIG. 2N*

| Element Name (CLEAR TEXT TAG) | START TAG | END TAG | ELEMENT DECLARATION | # OF ATTRIBUTES | # OF SUB-ELEMENTS | Pointer to Sub-Element Linked List |
|---|---|---|---|---|---|---|
| !DOCTYPE | – | 0 | DOCTYPE | 0 | 1 | →|
| SPDL | – | – | CHOICE | 0 | 2 | →|
| DOCUMENT | – | – | CHOICE | 0 | 2 | →|
| PAGESET | – | 0 | SEQUENCE | 1 | 2 | →|
| PICTURE | – | 0 | SEQUENCE | 2 | 2 | →|
| PROLOGUE | 0 | 0 | SEQUENCE | 0 | 8 | →|
| PS BODY | – | – | SEQUENCE OF CHOICE | 0 | 2 | →|
| PIC BODY | – | – | SEQUENCE OF CHOICE | 0 | 2 | →|
| DICTGENS | – | 0 | NO DECLARATION | 0 | 1 | →|
| DICTGEN | – | 0 | SEQUENCE | 1 | 2 | →|
| DICTID | – | 0 | NO DECLARATION | 0 | 1 | →|
| TOKENSEQ | – | 0 | OCTET STRING | 0 | 0 | → NULL |
| NAME | 0 | 0 | PRINTABLE STRING | 0 | 0 | → NULL |

*FIG. 5*

| ATTRIBUTE NAME | TYPE | TYPE MESSAGE | FLAG | DEFAULT VALUE |
|---|---|---|---|---|
| SPDLID | _ID | Public Identifier | 0 | ISO/IEC 10180 // SPDL |
| CNTNTTYP | _ID | Public Identifier | 0 | ISO/IEC 10180 // Content Type/SPDL Clear Text |
| SIZE | _SI | Short Integer | 2 | (No Default) |

*FIG. 7*

STANDARD PAGE DESCRIPTION LANGUAGE CLEARTEXT STRUCTURE GENERATOR

CROSS-REFERENCES TO RELATED APPLICATIONS

This application is a continuation-in-part of U.S. patent application, Ser. No. 07/931,808, now U.S. Pat. No. 5,416,986, issued May 16, 1995 and filed on Aug. 11, 1992 and entitled "A Method And System to Handle Dictionary Generation and Context Declaration in a Document Processing Language" which is a continuation-in-part of U.S. patent applications, Ser. No. 07/876,601, now U.S. Pat. No. 5,319,748, issued Jan. 7, 1994, and Ser. No. 07/876,251 now U.S. Pat. No. 5,325,484, issued Jan. 28, 1995 both filed on Apr. 30, 1992 and entitled "Method and Apparatus to Manage Picture and Pageset for Document Processing" and "Method and System to Handle Inclusion of External Files into a Document Processing Language," respectively, each of which is incorporated herein by reference.

BACKGROUND OF THE INVENTION

Field of the Invention

This invention is directed towards a method and apparatus for assisting in the creation of a file which is to be processed by a computer and must conform to a particular syntax. This invention is more particularly related to a method and system for assisting in the creation of a hierarchically structured file which is to be processed by a computer. This invention is even more particularly related to a method and system for assisting in the generation of a cleartext SPDL file.

Discussion of the Background

A standardized page description language has been proposed and is being developed as an international standard by the International Organization for Standardization ("ISO"). The proposal, to which one of the inventors is a contributor, is currently in draft form before a section of the ISO. The draft is known as ISO/IEC DIS 10180, labeled "INFORMATION PROCESSING TEXT— COMMUNICATION STANDARD PAGE DESCRIPTION LANGUAGE" and is available at the American National Standards Institute ("ANSI") in New York.

Standard Page Description Language ("SPDL") is a hierarchically structured page description language. This structured hierarchy allows a portion of a document to be printed without tracing through the entire document for formatting commands which may affect the particular portion being printed. Only the portion of the document which is hierarchically above the portion being printed needs to be processed to print the desired portion.

An additional advantage of SPDL is that it conforms to the Standard Generalized Markup Language ("SGML") as defined in ISO 8879:1986. This allows the structure of documents to be described and tagged in a generic fashion. Once tagged in SGML, files can travel seamlessly from one platform to another, without the use of conversion utilities and without the loss of structural formatting.

SPDL conforms to the Basic Encoding Rules set forth in ASN.1. A complete description of ASN.1 can be found in "ASN.1, The Tutorial and Reference," by Douglas Steedman, 1990, which is incorporated herein by reference.

Further advantages of SPDL are set forth in commonly owned co-pending U.S. patent applications Ser. No. 07/931,808 filed on Aug. 11, 1992, now U.S. Pat. No. 5,416,896, and entitled "A METHOD AND SYSTEM TO HANDLE DICTIONARY GENERATION AND CONTEXT DECLARATION IN A DOCUMENT PROCESSING LANGUAGE" which is a continuation-in-part of U.S. patent applications, Ser. No. 07/876,601, now U.S. Pat. No. 5,319,748 and Ser. No. 07/876,251, now U.S. Pat. No. 5,325,484 both filed on Apr. 30, 1992 and entitled "METHOD AND APPARATUS TO MANAGE PICTURE AND PAGE SET FOR DOCUMENT PROCESSING" and "METHOD AND SYSTEM TO HANDLE INCLUSION OF EXTERNAL FILES INTO A DOCUMENT PROCESS LANGUAGE," respectively, each of which is incorporated herein by reference.

As SPDL is a new page description language, at the time of this writing, no software packages or printers are commercially available which can process or print SPDL files. The present inventors are developing systems which can process and print SPDL files. However, to adequately test and debug these developing systems, it is necessary to generate test files which conform to SPDL requirements.

While creating SPDL test files, the present inventors encountered the problem of finding and organizing the correct structure tags using the encoding section of the Draft International Standard ("DIS"). To develop these test files, it was necessary to search through many pages of information to find the correct tags. The hierarchical structure sometimes required tracing through more than one page to determine the correct tag requirements. Also, when manually creating test files, misspellings frequently occurred in the test files.

SUMMARY OF THE INVENTION

Accordingly, an object of the present invention is to be able to quickly and accurately generate a test file which conforms to the requirements of a computer language.

It is a further object of this invention to automatically generate an SPDL cleartext file which conforms to all SPDL requirements.

It is yet another object of the invention to save and restore the current state of a generated file.

It is yet another object of the invention to use a previously created file and continue generation from a particular line.

These and other objects are accomplished by a new and useful method and apparatus for generating a hierarchically structured file. An element table is used to store the characteristics of each of the SPDL structure elements. Each element of the element table has a pointer to a sub-element linked list which contains the sub-elements which can appear under the hierarchy of each element. An attribute table is used to store the default values and other features of various SPDL attributes.

As an SPDL document is being created, an element stack is used to keep track of the position of the structure elements within the hierarchy. Each time an element is selected by a user, that element is pushed onto the element stack and a linked list is pointed to by each entry of the element stack. As further elements which are hierarchically below the previous elements are processed, they are pushed on top of the elements which are already present in the element stack. When a hierarchal element is finished being processed, it is popped off the element stack.

If a document or portion of a document is created using the present invention, it is possible to modify or add to the created file by using the data structures of the previously created file and add onto them. If a file is to be modified, it is not possible to insert a line between two previously created lines but it is only possible to take the previously created file and delete all lines after a given line and continue building the hierarchically structured document from that given line.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 illustrates a sample document which conforms to SPDL requirements as set forth in the draft standard.

FIGS. 2A–2N illustrate a computer display as the present invention is operated to generate the cleartext SPDL file illustrated in FIG. 1;

FIG. 5 is an element table which describes the features of exemplary SPDL structure elements;

FIG. 7 illustrates a sample attribute table used by the present invention;

DETAILED DESCRIPTION OF THE DRAWINGS

Figure 3:
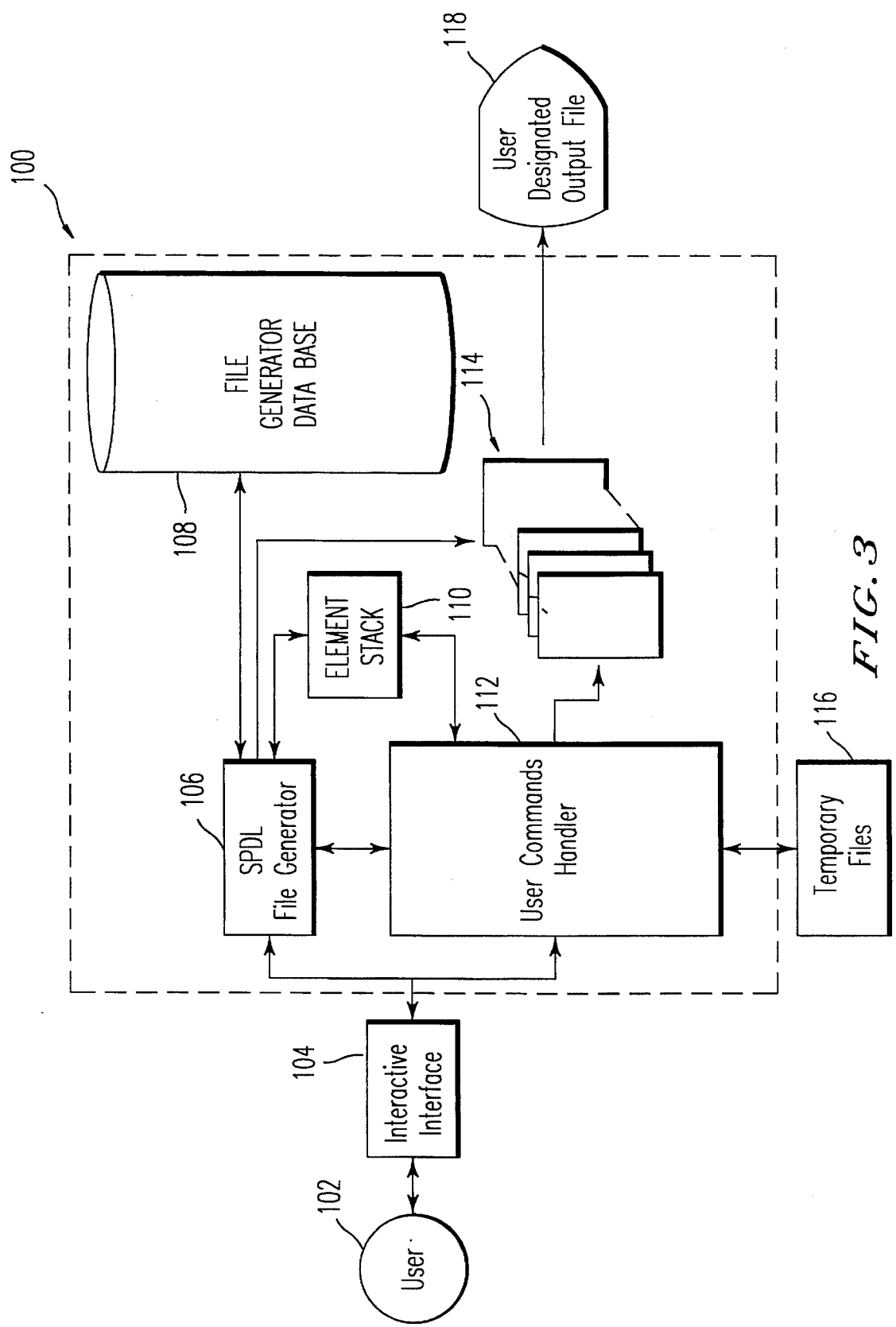
FIG. 3 is a block diagram illustrating various components of the present invention.

Referring now to the drawings, wherein like reference numerals designate identical or corresponding parts throughout the several views, and more particularly to FIG. 1 thereof, there is illustrated a sample clear text SPDL document which conforms to SPDL requirements set forth in the draft standard. Note that the requirements of the final version of SPDL may be different from the example given in FIG. 1 which conforms to the draft standard. However, based on the present disclosure, it would be obvious to modify the present invention to conform to any changes to the draft standard incorporated into the final version of the SPDL standard. Further, the present invention is not limited to the generation of SPDL files but can be used to generate a file which conforms to the requirements of any hierarchial description language.

The document illustrated in FIG. 1 contains 23 lines of cleartext information. The cleartext format is a form of SPDL which can be readily understood by a human and SPDL processing systems alike. Alternatively, an SPDL document can be represented in binary form but this form is very difficult for a human to read. It is possible to convert a cleartext SPDL document to a binary format and vice versa using a syntactic transformation. Therefore, a cleartext SPDL document generated by the present invention can always be converted to binary SPDL.

Most elements in the SPDL file illustrated in FIG. 1 have both a start tag and an end tag. For example, line 2 contains the tag <SPDL> as a start tag, indicating the document, is an SPDL document and line 23 contains the end tag </SPDL> which indicates the SPDL element has ended.

A complete description of the requirements of an SPDL document can be found in the SPDL standard ISO/IEC 10180, which is incorporated herein by reference. However, a complete understanding of the requirements of the SPDL language is not required for a complete understanding of this invention and a detailed description of each SPDL structure element has been omitted for clarity sake.

TABLE 1

| USER COMMANDS | CHARACTERISTICS OF THE USER COMMANDS |
| --- | --- |
| / - Slash | Makes an end-tag for the current element. For example, if the current element is < PROLOGUE >, the slash command will make a </PROLOGUE > end-tag for the user. |
| C - Comment | Makes an SPDL comment right after the current element. For example, if current element is < PROLOGUE >, the "C" command will make a < COMMENT > start-tag for the user. The user can input any comment data line after line until "/" is specified. |
| E - ExtID | Allows the user to insert an External Identifier from the current line. For example, if user types in "E", then the system will prompt for user to input the External Identifier. |
| G - GoTo | Allows the user to update his file starting from the specified line number up to the last one. For example, if user types "G", the system will prompt the line number range information to allow the user to input the line number to go to. Once the user inputs the number, everything after that number will be modified. |
| L - List | List the Line Data Information starting from line number 1. |
| S - Save File | Save the current work to a temporary file. |
| R - Restore file | Restore the file which was saved by issuing the Save command. |
| Q - Quit | Quit and exit the file generator. |

Table 1 illustrates the user commands of the present invention and the characteristics thereof. The "/" slash command constructs an end-tag for the current element. For example, if the current element being processed by the present invention is <PROLOGUE>, the slash command will make a </PROLOGUE> end-tag for the user.

The "C" comment command allows creation of an SPDL comment immediately after the current element.

The "E" ExtID allows the user to insert an external identifier into the listing. For example, if the user types in "E" the system will prompt for user to input an External Identifier. An External Identifier is a structure element which is subordinate to an External Declaration structure element contained in a prologue. An External Declaration is used to connect the External Identifier to the source of the external entity which is to be included in the SPDL document. The External Identifier is used to include the external entity at a particular point in the SPDL document.

The "G" GoTo command allows the user to create a file using lines of data which have been previously created. If the user types "G", the system will prompt the user for the line number to go to. Once the user inputs that line number, any lines after that line number will be deleted and the user will then enter the appropriate commands to generate the desired lines of data. Note that the hierarchical structure of SPDL prevents a user from inserting a line between two previously created lines.

The "L" List command lists the line data information starting from line number 1. The "S" Save File command saves the current work to a file for storage. The "R" Restore File command restores a file which was previously saved using the save command. The "Q" Quit command quits and exits the file generator.

Before a detailed explanation of the operation of the present invention is given, an example of how the present invention operates to create the listing illustrated in FIG. 1 will be given with respect to FIGS. 2A–2N. FIG. 2A illustrates the initial screen when the present invention is first run on a computer. The user has three enumerated choices in addition to the menu line which includes the commands /, Comment, ExtID, GoTo, List, Save, Restore and Quit. In FIG. 2A, the user inputs "1" followed by a carriage return and then the line data information for line 1 is displayed. Line 1, which indicates the document type, is required for an SPDL document to conform to the draft standard.

In FIG. 2B, the current element is <DOCTYPE> and there is only one element which is permitted under <DOCTYPE> and that is <SPDL>. The user selects "1" and the line data information is displayed as illustrated at the bottom of FIG. 2B.

In FIG. 2C, the current element is <SPDL> and the declaration is "choice." A complete explanation of the element declarations will be given with respect to FIGS. 5–6L. The declaration "choice" means that only one of the elements can appear below the current element and the user must chose one of them. The declaration "sequence" means that a plurality of elements of a list of elements can appear below the current element. However, the elements must appear in a specific order if they are to appear at all. In FIG. 2C, the declaration for <SPDL> is choice. Therefore, the user has the choice of either the first element which is a document or the second element which is a resource definition. The user has selected the first element which is a document and the line data information is as illustrated in the bottom portion of FIG. 2C.

In FIG. 2D, the current element is <DOCUMENT> and the declaration for the <DOCUMENT> element is the choice. The user has the choice of the pageset or picture element and the user selects picture. The picture element includes two attributes which are "spdlid" and "cntnttyp" as illustrated in the bottom of 2D. A complete explanation of the attributes in SPDL will be given with respect to FIGS. 6A–7.

In FIG. 2E, the user has a choice of a prologue or a picture body structure element. The user selects the prologue and the line data information is as illustrated at the bottom of FIG. 2E.

In FIG. 2F, the current element is the prologue and the user can select one or more of the eight elements which are permitted under the prologue structure element. In FIG. 2F, the user selects the dictionary generators element and the line data information is as illustrated in FIG. 2F.

In FIG. 2G, the user selects the dictionary generator element and is required to enter the size attribute for the dictionary generator. In FIG. 2G, the user enters a size of 4 and the line data information is as illustrated at the bottom of FIG. 2G.

In FIG. 2H, the current element is the dictionary generator and the declaration is a sequence. The user selects the dictionary identifier element and the line data information is as illustrated at the bottom of FIG. 2H.

In FIG. 2I, the user selects the element dictionary name and is therefore required to enter a name for the dictionary. The user enters the name "Alpha" and the line data information is as illustrated at the bottom of FIG. 2I. Note that when the name element ends, the process of the present invention knows that the dictionary identifier element will also end and consequently, the end-tags for both the name and dictionary identifier elements are automatically inserted into the file.

In FIG. 2J, the current element is the dictionary generator and the user selects the token sequence element. The user then enters two lines of token sequence input followed by the slash symbol indicating the end of the token sequence input. The user then enters the slash symbol followed by the carriage return and the line data information is as illustrated at the bottom of FIG. 2J. Note that the two inputted lines of token sequences are for illustrative purposes only and do not necessarily illustrate the exact syntax required by SPDL.

In FIG. 2K, the current element is the dictionary generator and the user can enter zero or more additional token sequence elements for the dictionary being created. The user enters the slash symbol indicating the end of the dictionary generator structure element and the line data information is as illustrated in FIG. 2K.

In FIG. 2L, the current element is dictionary generators and the user can enter zero or more additional dictionary generator elements. The user enters the slash key, indicating the end of the dictionary generators element and the line data information is as illustrated in FIG. 2L.

In FIG. 2M, the current element is the prologue and the user has the choice of entering an optional setup procedures structure element. The user inputs the slash symbol indicating the end of the prologue structure element and the line data information is as illustrated in FIG. 2M.

In FIG. 2N, the current element is the picture and the user can select the optional picture body structure element. The user selects the slash symbol signifying the end of the picture structure element. Once the picture structure element has ended, SPDL requirements have the document and SPDL structure elements end. The file has finished being created and is saved as the default file name and the creation of the SPDL file ends.

FIG. 3 illustrates a block diagram of the SPDL cleartext file generator system, The block diagram illustrates the elements as being conceptually separate but in practice, the invention can be embodied in a general purpose computer. An user 102 communicates with the SPDL cleartext file generator system through interactive interface 104 which displays messages from the file generator and accepts input from the user. The interactive interface 104 is connected to an SPDL file generator 106 and an user commands handler 112. The SPDL file generator 106 is the element which actually generates the SPDL file and the user commands handler 112 processes the various user commands which have been previously described with respect to Table 1.

There is a file generator database 108 which contains the necessary information to create the SPDL file. Within the file generator database, there is an element table, a sub-element table and an attribute table. Each of these tables will be described in detail with respect to FIGS. 5–7.

An element stack 110 is used to keep track of the position of the elements within the hierarchical structure of the SPDL file being created. As the SPDL cleartext file generator system 100 is being used, temporary files 116 are saved and restored by the user commands handler 112. As the SPDL files are being created, the information for each line is saved in line data linked list data structures 114. After the user has finished inputting information, the line data linked list data structures 114 are used to save a user designated output file 118.

Figure 4:
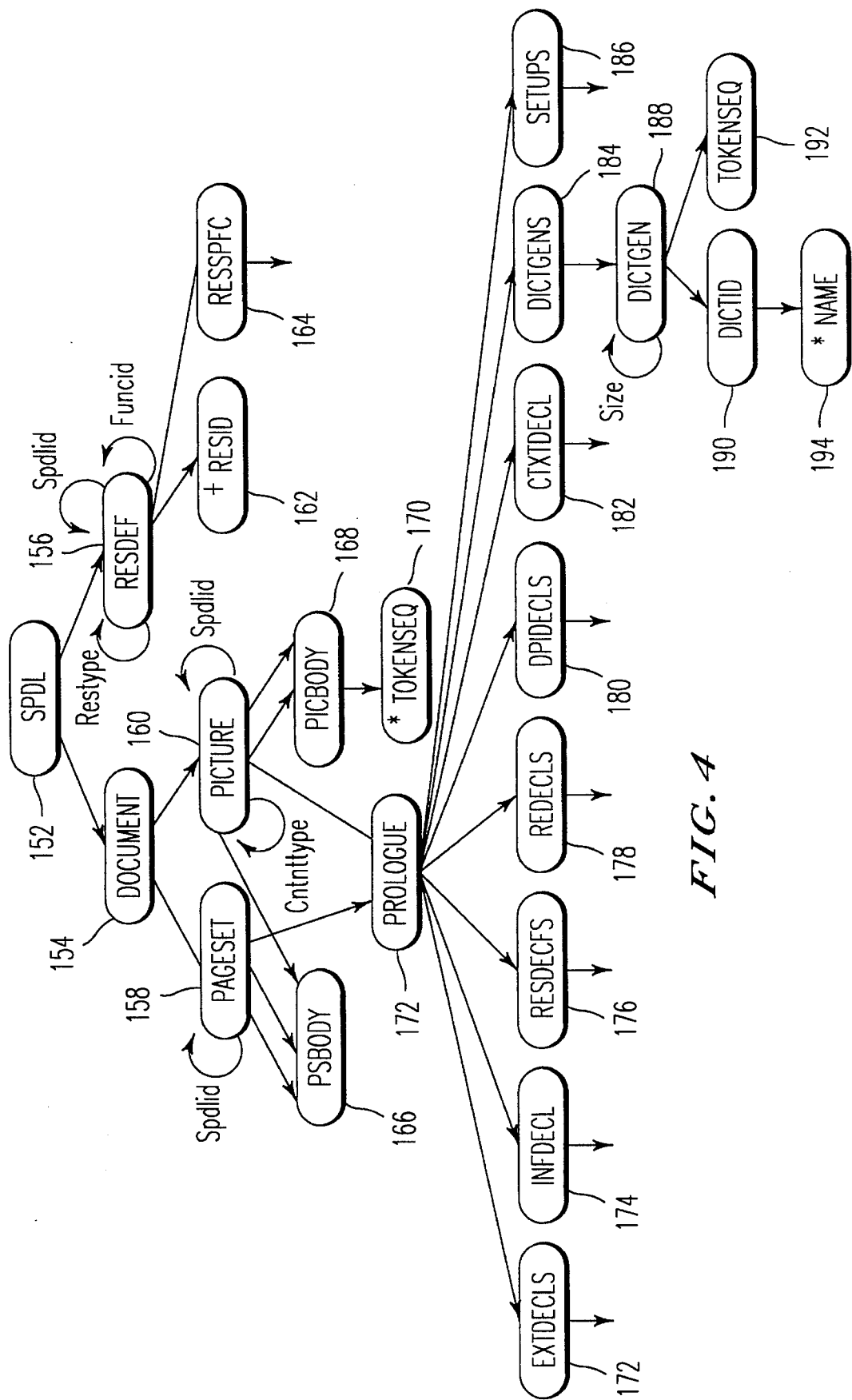
FIG. 4 is a partial illustration of an SPDL element state transition diagram.

To determine the order of the hierarchy in SPDL, the present inventors have constructed an SPDL element state transition diagram, as illustrated in FIG. 4, using the description of the SPDL elements contained in the draft standard. FIG. 4 illustrates the hierarchy of the SPDL structure elements using the tree structure contained therein and illustrates the attributes for the various SPDL elements by showing a labeled circular arrow for the attribute originating from an element and returning to that same element. From the state transition diagram, the inventors were able to create the sub-element linked-list data structures illustrated in FIGS. 6A–6L.

The first element in the transition diagram is SPDL 152. There are two possible elements which can appear under the SPDL element; the document element 154 and the resource definition element 156. The resource definition element 156 is illustrated as having three attributes; the resource type attribute, the SPDL ID attribute and the function ID attribute. Attributes can have either fixed values or values input by a user, as will be described in complete detail with respect to the attribute table illustrated in FIG. 7.

In FIG. 4, the terminal elements or the lowest elements in a particular hierarchy have been marked with an asterisk and the elements which have been previously defined are marked with a plus sign. The terminal elements can be at the lowest level in a particular hierarchy whereas the other elements cannot. The SPDL element state transition diagram illustrated in FIG. 4 is not a complete diagram and omits some of the SPDL structure elements for clarity sake. For example, there are structure elements which appear under the resource-specification 164, the external declarations 172, the informative declaration 174, the resource definitions 176, the resource declarations 178, the DPI declarations 180, the context declaration 182, and the setup procedures 186.

Under the document structure element 154 are a pageset element 158 and a picture element 160. Under the pageset 158 are the pageset body 166 and the prologue 172. As is illustrated in FIG. 4, a picture element 160 can also appear under the pageset body 166.

The picture element 160 has an attribute of the content type and the SPDL ID. SPDL elements which can appear under the picture element 160 are the prologue 172 and the picture body 168. A token sequence 170 can appear under the picture body 168. The dictionary generators 184 appearing under the prologue 172 can have the dictionary generator element 188 appearing thereunder which has an attribute of size. The SPDL structure elements which can appear under the dictionary 188 are a dictionary ID 190, a name 194 and a token sequence 192.

FIG. 5 illustrates the SPDL element table used by the present invention. The first column in the element table is the element name or the cleartext tag of the element. The next two columns indicate whether the start tag and end tag can be omitted or are required. The hyphen indicates that the tag is required and the O indicates that the tag is optional.

The fourth column of the element table contains the Element Declaration. The Element Declaration is a description of the characteristics of the element. More particularly, the Element Declaration relates to the sub-elements which occur under the element and describes either the characteristics of the element in the Element Name or the handling of the subordinate structure elements. For example, DOCTYPE, NO DECLARATION, OCTET STRING, and PRINTABLE STRING are the first type of Element Declaration. CHOICE, SEQUENCE, and SEQUENCE OF CHOICE are the second type of Element Declaration.

The DOCTYPE element declaration is a special declaration used only for the !DOCTYPE element. The choice declaration indicates that the user can choose any one of the sub-elements under the element. The sequence declaration indicates that the sub-elements appearing under the element must appear in a particular sequence and this sequence cannot be altered.

The sequence of choice declaration repeats the choice declaration, allowing more than one subordinate structure element to be chosen. The declaration "no declaration" means that the Element has only one subordinate structure element.

The octet string declaration indicates that the element is a character string of 8 bit bites. The printable string declaration indicates that the element is a printable string.

Other declarations are used by other SPDL document types but the details of these declarations are omitted for clarity sake. Based on the description of the invention contained herein and a complete understanding of SPDL contained in the standard, the construction of the present invention to handle all detailed requirements of SPDL is obvious.

The fifth column indicates the number of attributes of the element. An attribute describes various features of an element and the details of the attributes will be described with respect to FIGS. 6A–6L and FIG. 7.

The sixth column of the element table indicates the number of sub-elements of the element. The number of sub-elements indicates the number of different sub-elements which can appear under the element. The last column in the element table is the pointer to the sub-element linked list data structures which are illustrated in FIGS. 6A–6L.

A complete description of each element appearing in the element table will not be given as these features are clearly illustrated in the element table. To read the element table, look at the left most column for the element name. For example, the second element in the table is SPDL. The hyphen for both the start tag and the end tag indicate that the start tag and the end tag for SPDL are required. Note that even though certain start tags and end tags are optional, the present invention has been constructed to always insert a start tag and end tag for an element, whether they are optional or required. However, it is always possible to construct the present invention to omit the tags when they are not required. The element table illustrated in FIG. 5 is also used for processes other than the SPDL generator. That is why not every element appearing in the element table or sub-element linked lists may not appear as if it is serving any purpose. However, every element illustrated is used by one of the systems created by the present inventors.

The element declaration has been previously explained and for the SPDL element, the element declaration is choice. The element table illustrates that the number of attributes for the SPDL element is zero and the number of sum-elements is two.

The pointer to the sub-element linked list for each element can be found in FIGS. 6A–6L when the pointer is not set for null as for the token sequence and name element illustrated at the bottom of FIG. 5.

Figure 6A:
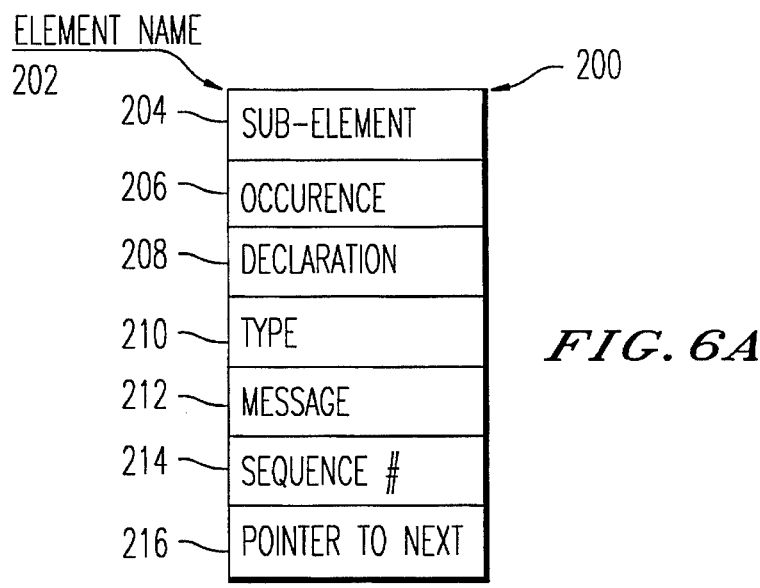
FIGS. 6A–6L illustrate sub-element linked lists which are pointed to by the structure elements in the element table illustrated in FIG. 5.
Figure 6B:
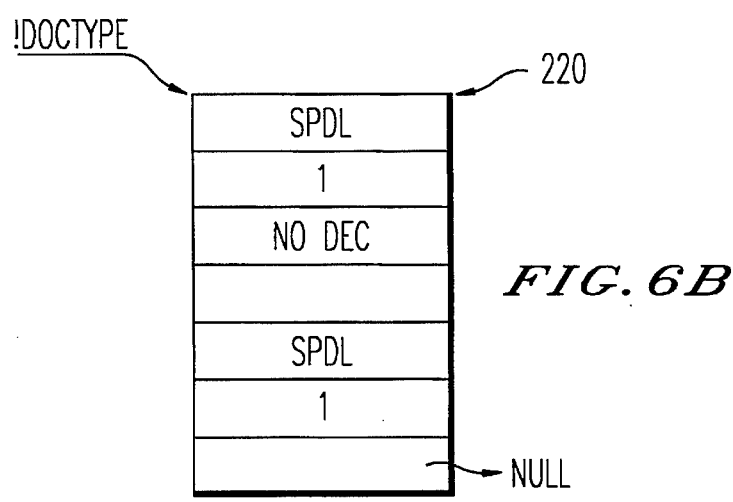
Figure 6C:
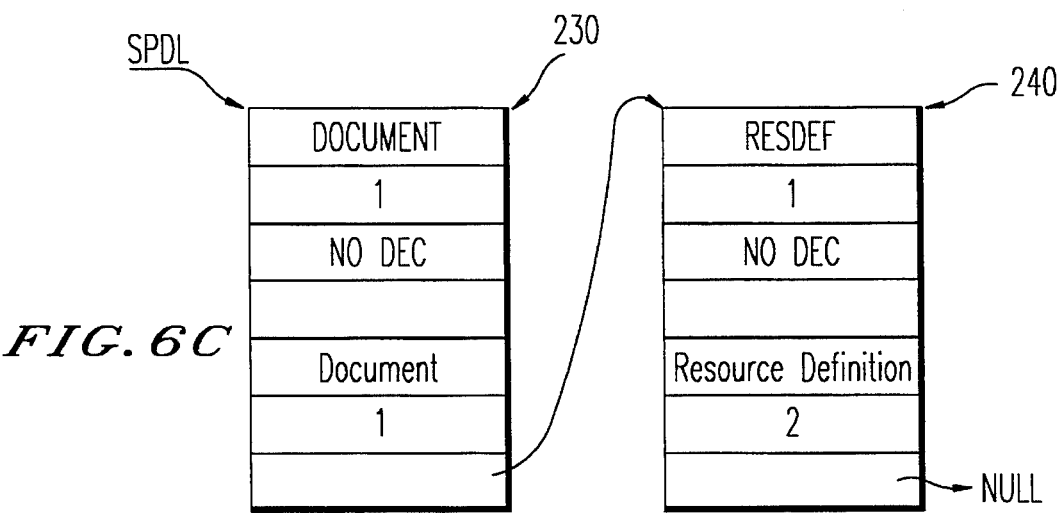
Figure 6D:
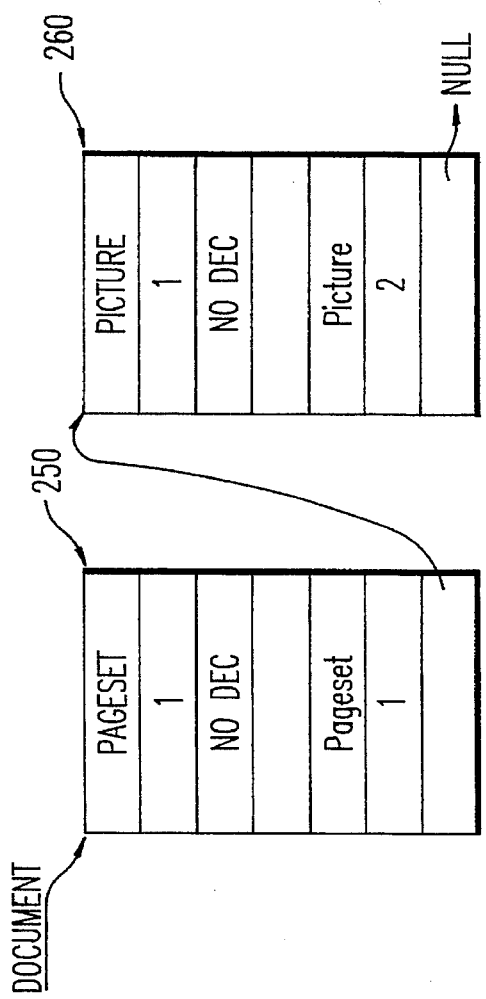
Figure 6E:
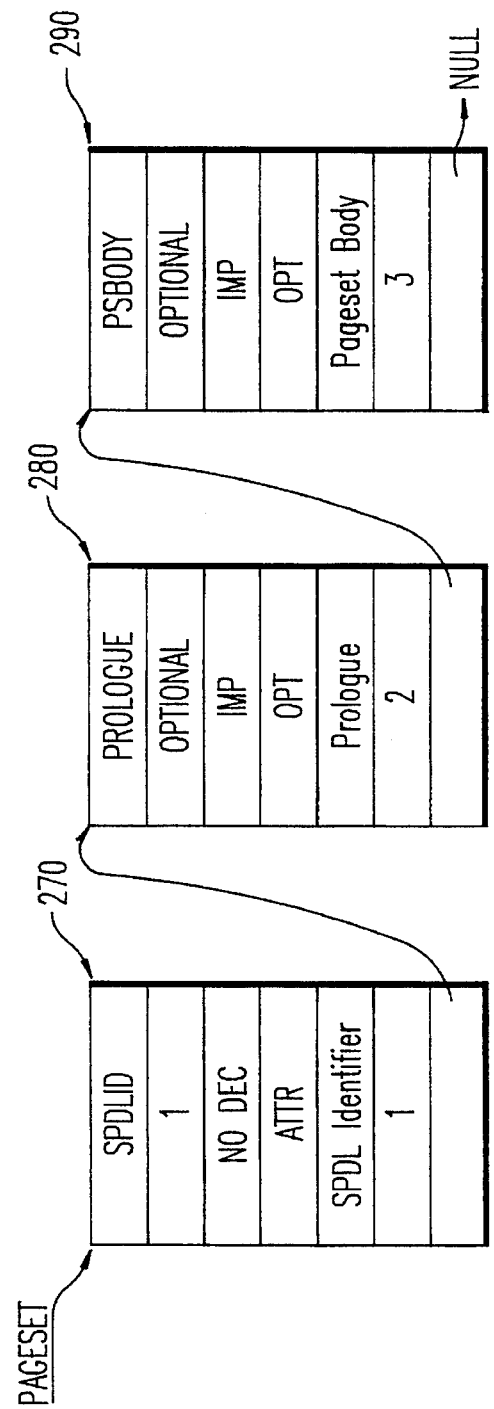
Figure 6F:
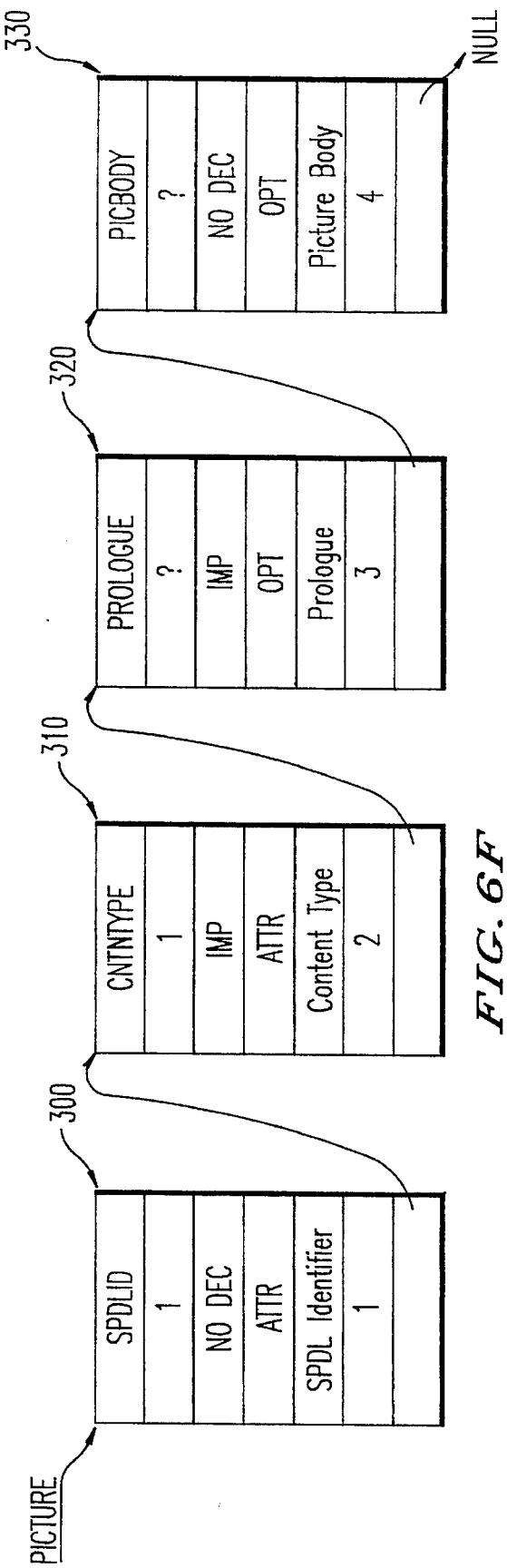
Figure 6G:
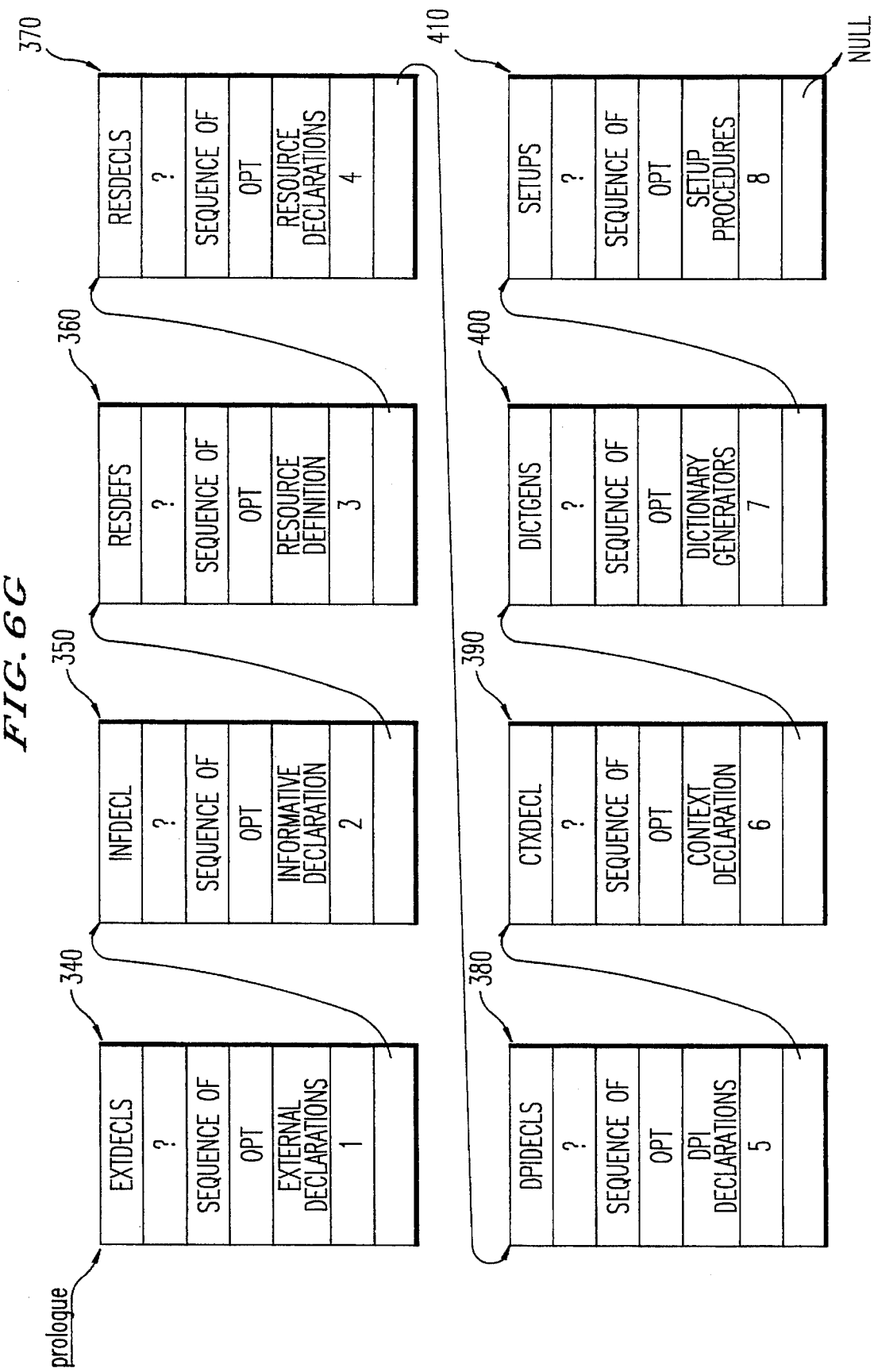
Figure 6H:
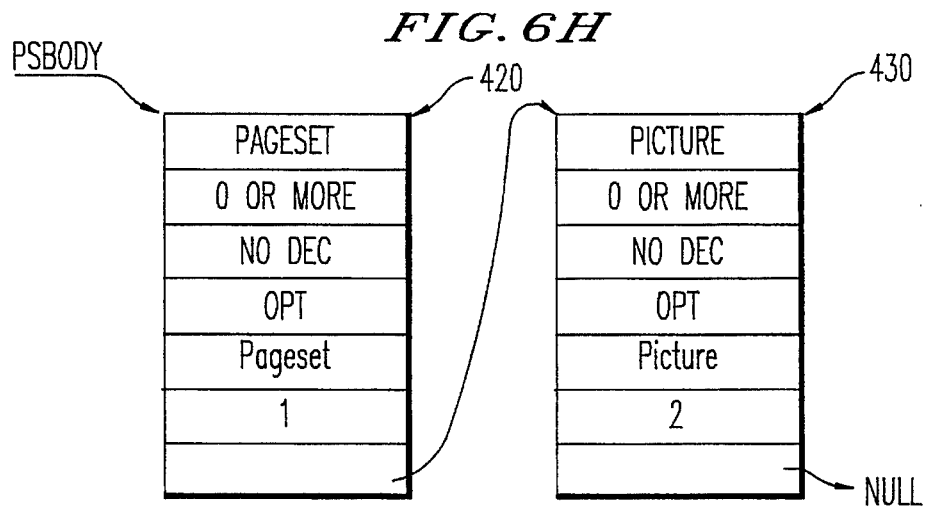
Figure 6I:
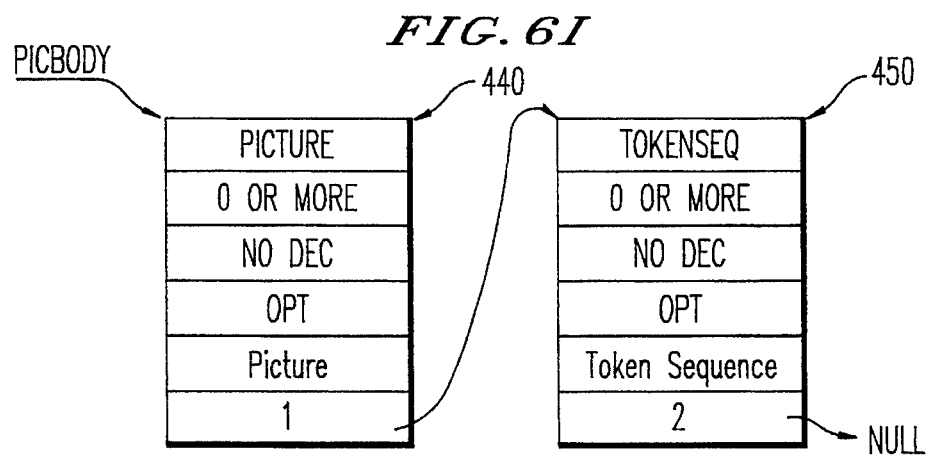
Figure 6J:
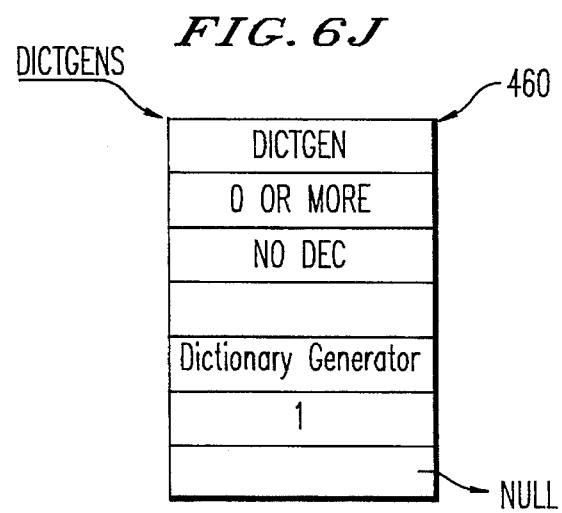
Figure 6K:
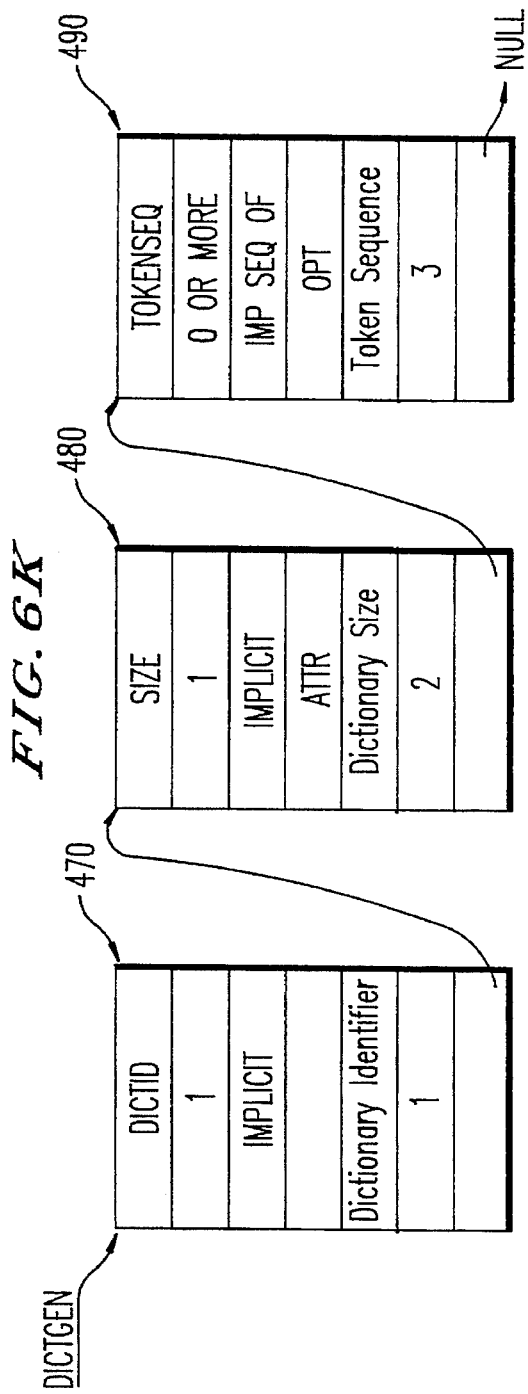
Figure 6L:
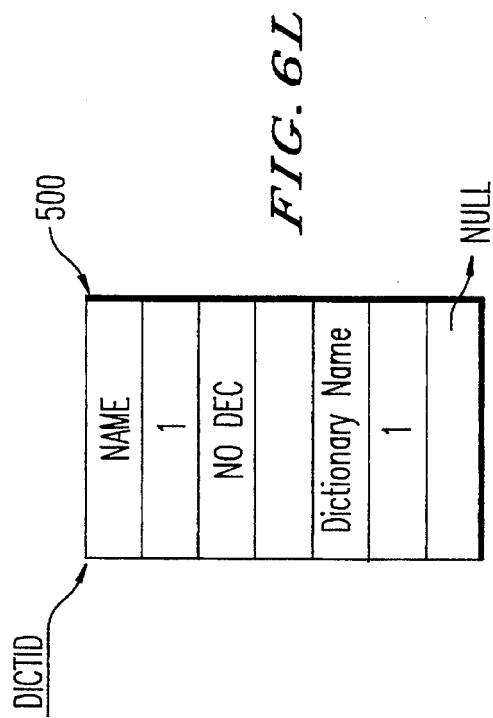

FIG. 6A–6L illustrate the sub-element linked lists which are pointed to by the element table illustrated in FIG. 5. FIG. 6A illustrates the various fields of a sub-element linked list data structure 200. The data structure 200 is pointed to by pointer 202 which is from the right most column of the element table illustrated in FIG. 5. The first field in the data structure is the sub-element name 204. This is the name of a sub-element which can appear under the corresponding element of the element table illustrated in FIG. 5.

The next field of the data structure 200 is the occurrence 206 of the sub-element. The occurrence describes how many times the particular sub-element can occur. The possible entries for the occurrence field 206 are 1, indicating that the sub-element occurs once, asterisk ("*") indicating the sub-element can occur zero or more times, plus sign ("+") indicating the sub-element occurs 1 or more times, and question mark ("?") indicating that the sub-element is optional and can occur zero or one time.

A declaration field 208 describes the declaration of the sub-element and uses the same declarations as were described for the declaration entry of the element table illustrated in FIG. 5. A type field 210 describes the type of sub-element. The possible types of sub-elements are an attribute, optional, default, or terminating and combinations of these four types are allowed. In actual implementation of the invention, the types of sub-elements can be represented using four bits for the four types. It is also possible for the type of sub-element to be empty if it does not fit one of the previously recited four types of sub-elements.

A message field 212 contains the message which is displayed for the user when the user is asked to select the sub-element.

Field 214 contains the sequence number of the sub-element which is the number of the sub-element linked list data structure. For example, the first sub-element for a particular element has a sequence number of 1 and the linked list data structure pointed to by the first linked list data structure of a sub-element (the second sub-element) has a sequence number of 2.

The last field of the sub-element linked list data structure is the pointer to the next sub-element linked list data structure. If a particular element has a number of different sub-elements appearing thereunder in the hierarchy, each sub-element will have its own linked list data structure. The sub-element linked list data structures are linked together by the pointer 216 which points to a subsequent sub-element linked list data structure of a particular element.

FIG. 6B illustrates the sub-element linked list data structure 220 for the element !DOCTYPE. The sub-element name for the element !DOCTYPE is SPDL. The occurrence for the sub-element SPDL is 1, indicating that SPDL must appear once under the element !DOCTYPE. There is no declaration for SPDL and there is no particular type of sub-element for SPDL. The message displayed for the user to select for the SPDL sub-element is SPDL and the sequence number for the SPDL sub-element is 1 as it is the first and only sub-element for !DOCTYPE. The pointer to the next data structure of the SPDL sub-element points to null which indicates that there are no sub-element linked list data structures occurring after the SPDL sub-element linked list data structure.

FIGS. 6C and 6D illustrate the sub-element linked list data structures for the SPDL and DOCUMENT structure elements. These figures illustrate the sub-element linked list data structures in a similar manner as FIG. 6B is illustrated.

FIG. 6E illustrates the sub-element linked list data structure for the PAGESET structure element. The PAGESET structure element can have three sub-elements appearing thereunder; SPDLID, PROLOGUE, and PSBODY. The SPDLID 270 sub-element must occur once, has no declaration, and is an attribute. The PROLOGUE sub-element is optional, its declaration is implicit and its type is optional. Implicit is used for binary encoding where the suggested ASN.1 tag is optional. As the present invention is concerned with a clear text generator, Implicit is not needed.

Most values in the "TYPE" field of the sub-element linked list data structure are not necessary in the present invention. The ATTR (attribute) value in the type field is necessary to ask a user to input the attribute.

The sequence number for the PROLOGUE sub-element linked list data structure is 2, indicating that it is the second in the string of the linked list data structure sub-elements for the PAGESET element.

The third sub-element which can appear under the pageset element is the PAGESET body 290 which is optional, has a declaration of implicit, and has a pointer to the next sub-element of null as it is the last in the linked list of sub-elements for PAGESET.

The sub-element linked list data structures appearing in FIGS. 6F–6L follow the same format as the format of the previously explained linked list data structures. Accordingly, a detailed description of each of these figures has been omitted for the sake of brevity.

FIG. 7 illustrates the attribute table used by the present invention. When an attribute is found in a sub-element linked list, the attribute table illustrated in FIG. 7 is used to look up the particular features of the attribute. For example, when the PAGESET element is selected, it can be seen in FIG. 6E that the SPDLID is an attribute for the PAGESET. Consequently, the SPDLID is looked up in the attribute table in FIG. 7. The type of the SPDLID attribute is __ID and the type message displayed for the user is an object identifier.

The Flag column for the attribute table indicates various features of the attribute. A flag of "0" indicates the value of the attribute is fixed, "1" indicates the attribute may default, and "2" indicates input from the user may be needed.

The default value column of the attribute table illustrated in FIG. 7 indicates the default of the particular attribute. For example, the SPDLID attribute has a default value of ISO/IEC 10180//SPDL. There is no default value for the attribute SIZE as the user must enter the particular SIZE of the element in question. When the SPDLID is looked up in the attribute table, the default value is supplied and inserted into the file being created.

Figure 8:
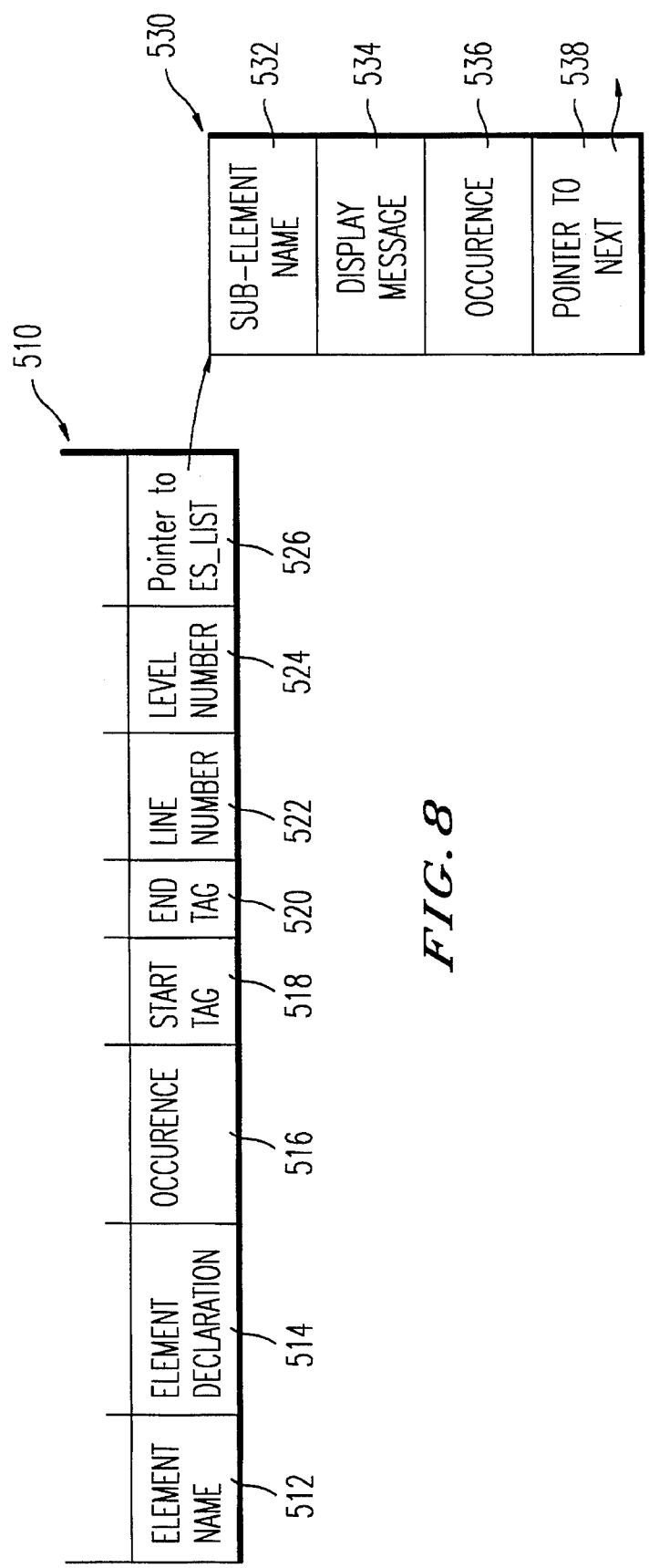
FIG. 8 illustrates the element stack used by the present invention.

FIG. 8 illustrates an element stack 510 used to keep track of the hierarchical levels as an SPDL file is being created. The element stack 510 contains the following fields for each level in the element stack: a field 512 for the element name, a field 514 for the declaration of the element, a field 516 for the occurrence of the element, fields 518 and 520 for the start and end tags of the element respectively, a field 522 for the line number of the element in the SPDL file being created, a field 524 for the level number of the SPDL file being created, and a pointer to a linked list data structure of the element stack 526. The element name 512, the element declaration 514, the occurrence 516, the start tag 518 and the end tag 520 contain the corresponding elements as described with respect to FIGS. 5 and 6A–6L. The line number field 522 is used to indicate the line number of the element in the level number 524 is used to keep track of the indentation level of the element in the file.

The pointer to ES_LIST 526 points to a linked list data structure 530 of the particular level in the stack. The linked list data structure 530 is used to keep track of the various sub-elements which can appear under the hierarchy of the element in the element stack. When a sub-element in the sub-element linked list is chosen, if the element above the sub-element permits additional sub-elements in the sub-element linked list to be chosen, the pointer to ES_LIST and/or the linked lists of the element stack will be modified accordingly. This feature will be explained in detail using the flowcharts described herein.

The fields of the linked list data structure of the elements stack are the sub-element name 532, the display message 534, the occurrence of the sub-element 536 and a pointer to a next linked list data structure of the element stack 538. The fields of the linked list of the element stack have the same meanings as the corresponding fields of the element table illustrated in FIG. 5 and the linked list data structures of the sub-elements illustrated in FIGS. 6A–6L.

Figure 9:
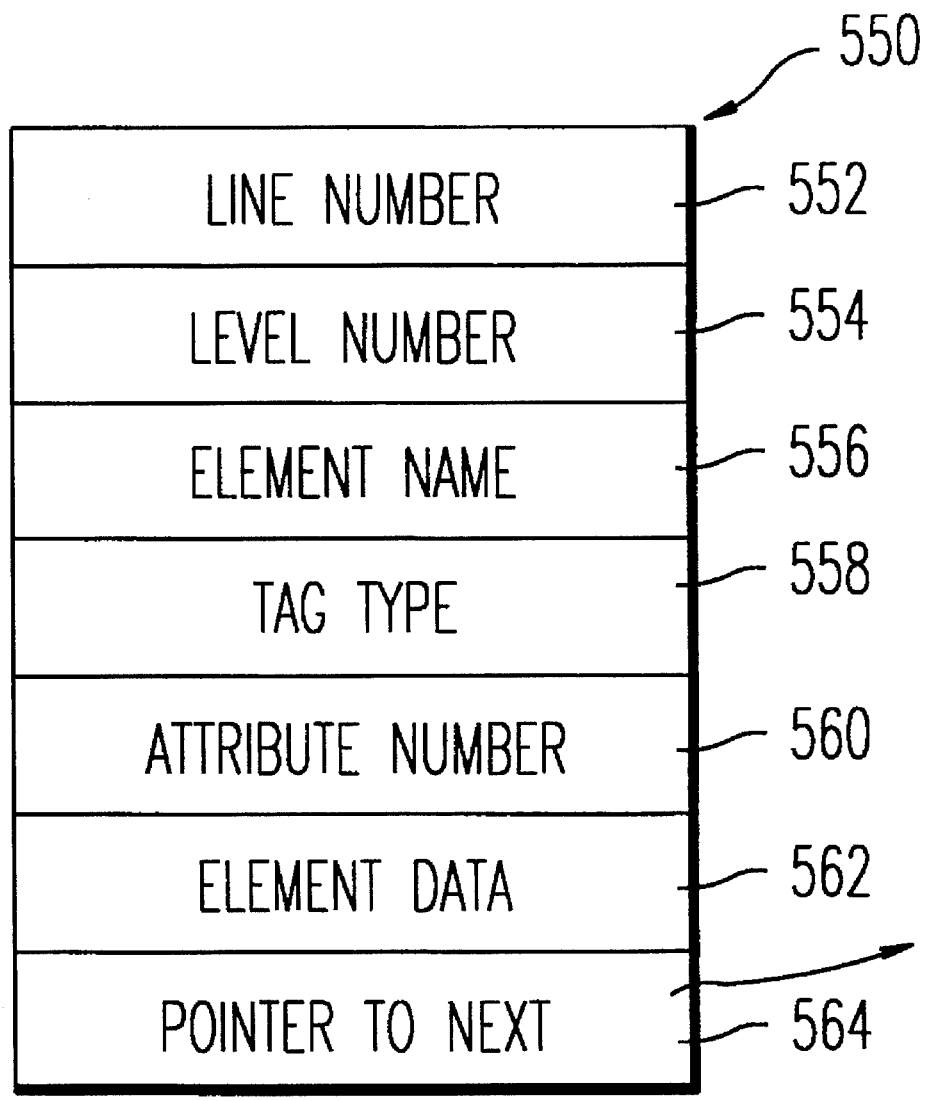
FIG. 9 illustrates the line data linked list data structure used to keep track of the information for each line of a generated file.

FIG. 9 illustrates the line data linked list data structure used for keeping tract of each line of the generated SPDL file. The line number field 552 indicates the particular line number of the element, the level number 554 indicates the indentation level of the element, the element name field 556 indicates the name of the element appearing on the line, the tag type field 558 indicates the tag type of the element. A tag type of 1 indicates DOCTYPE, 2 indicates a start tag, 3 indicates an end tag and 4 indicates an attribute. The attribute number 560 indicates the number of the attribute, if any of the element, the element data 562 is used to keep track of the attribute, if any of the line, and the pointer to next 564 points to the line data linked list data structure of the next line of the generated SPDL file.

If an SPDL element has more than one attribute, it will be necessary to have more than one line in the generated SPDL file which contains the element named in each attribute. Therefore, if there is more than one attribute for a given SPDL element, each attribute will have its own line data linked list data structure and its own line number but the element name 556 will be the same for each attribute.

Figure 10A:
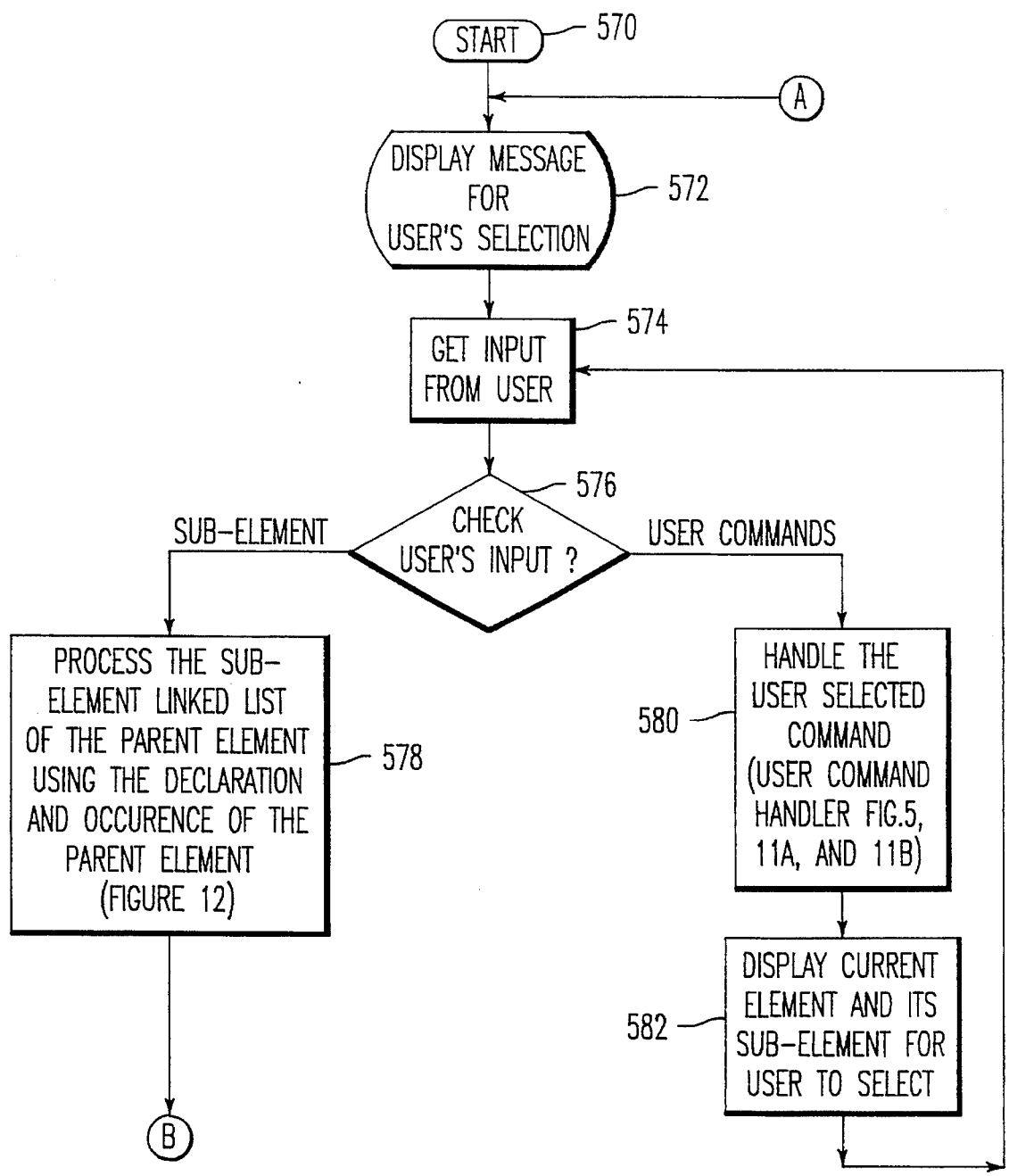
FIG. 10A and 10B illustrate the process used by the present invention.
Figure 10B:
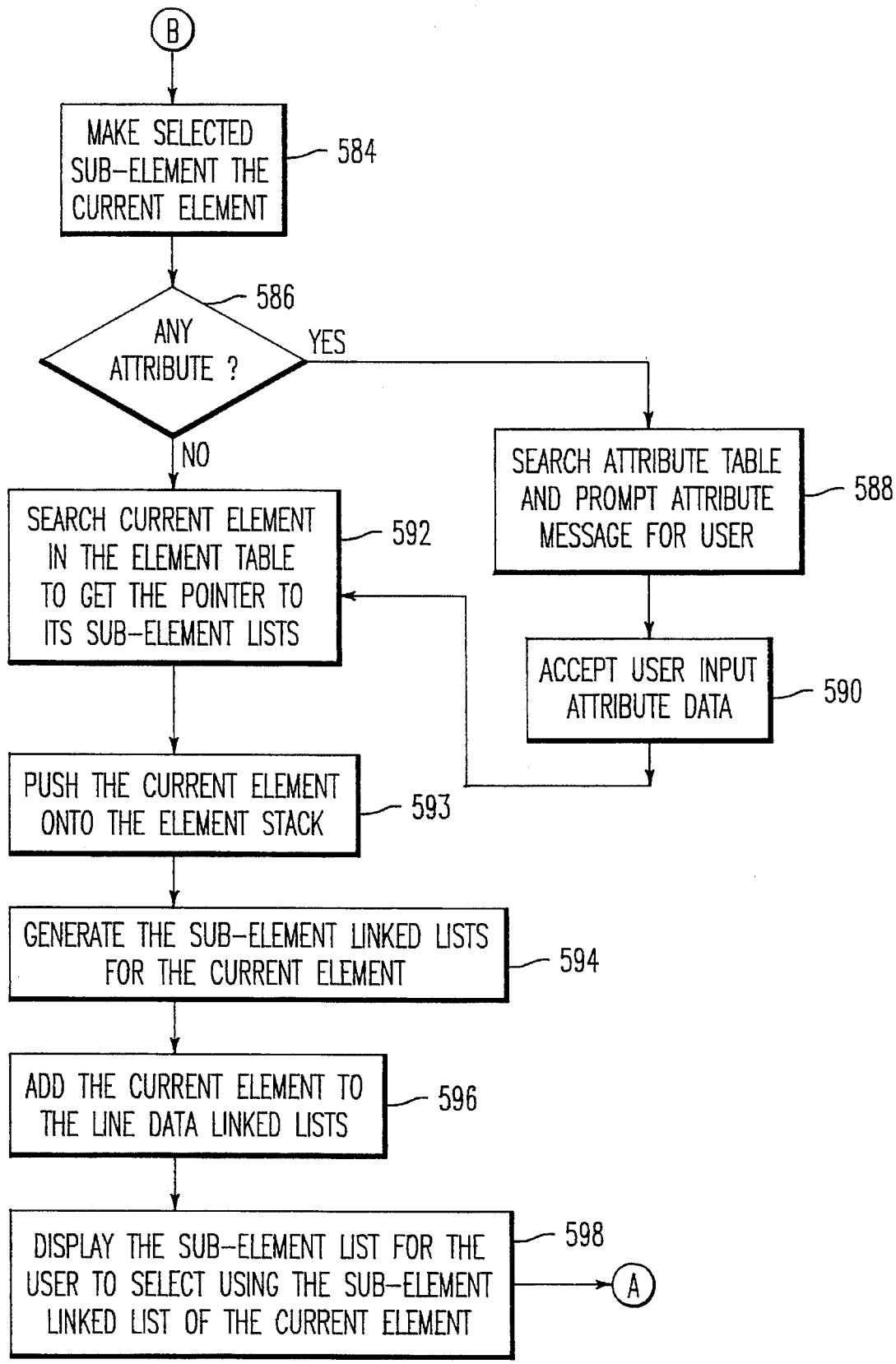

FIGS. 10A and 10B illustrate the process of the present invention. In FIG. 10A, step 572 displays the message used for inputting the user's selection. When the present invention is initially run, the message displayed is as illustrated in FIG. 2A. Step 574 inputs the selection of the user. The user can select any of the enumerated selections which pertain to the menu choices or a displayed sub-element. As previously described with respect to Table 1, the user commands are /, the Comment command, the External ID command, the GoTo command, the List command, the Save command, the Restore command, and the Quit command.

Step 576 then checks the user's input. The user input can either be a selection of a sub-element or an entry of a user command. If a sub-element is selected, flow proceeds to the left of step 576 to step 578 which processes the sub-element linked list of the parent element using the declaration and occurrence of the parent element. The parent element is the element immediately above the selected sub-element in the hierarchy. Depending on the occurrence and declaration of the element, the selection of a sub-element affects the sub-element linked list data structure of the parent element in the element stack.

Figure 12A:
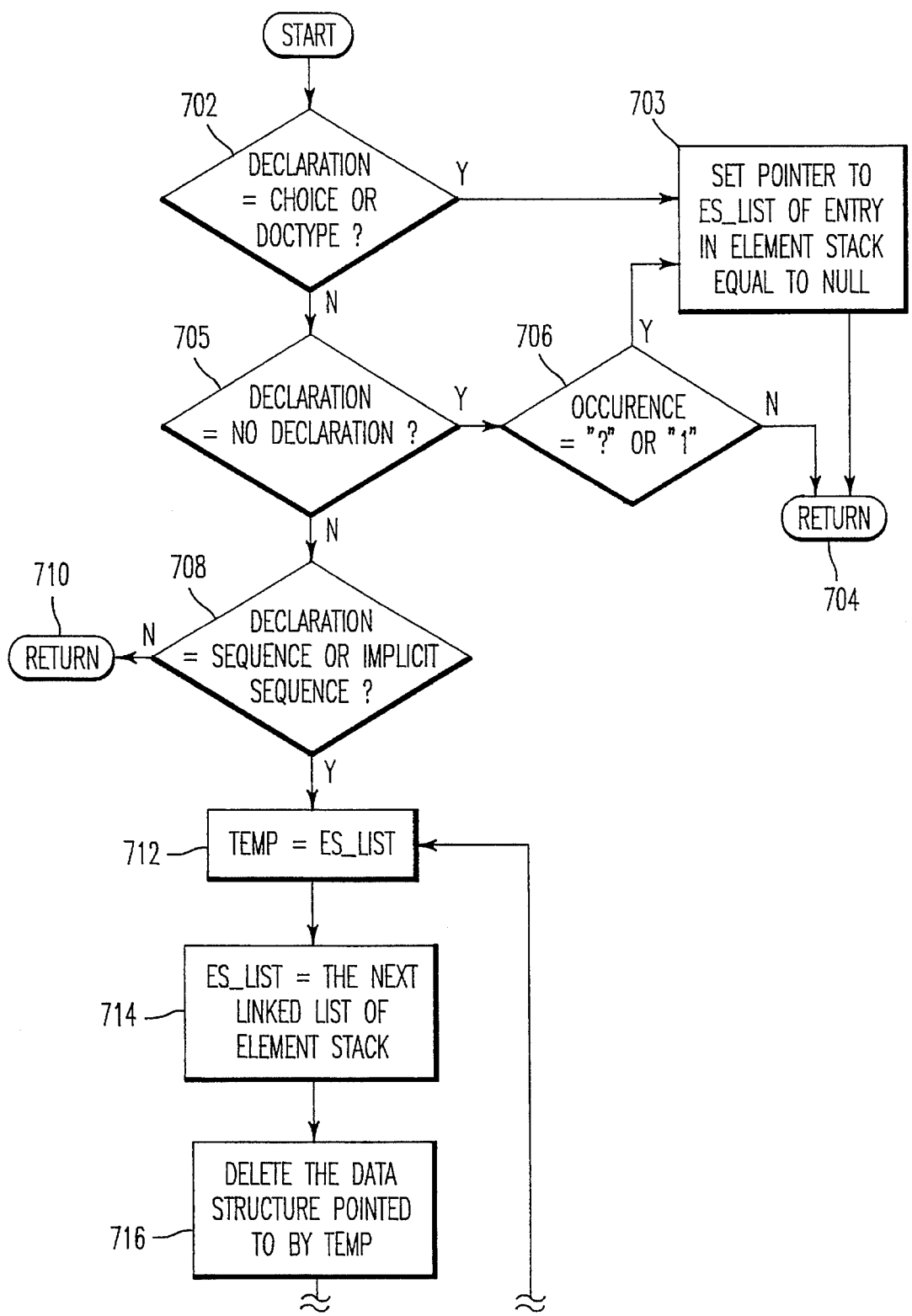
FIGS. 12A and 12B illustrate in detail the process used for processing sub-element linked lists using element declarations and sub-element occurrences.
Figure 12B:
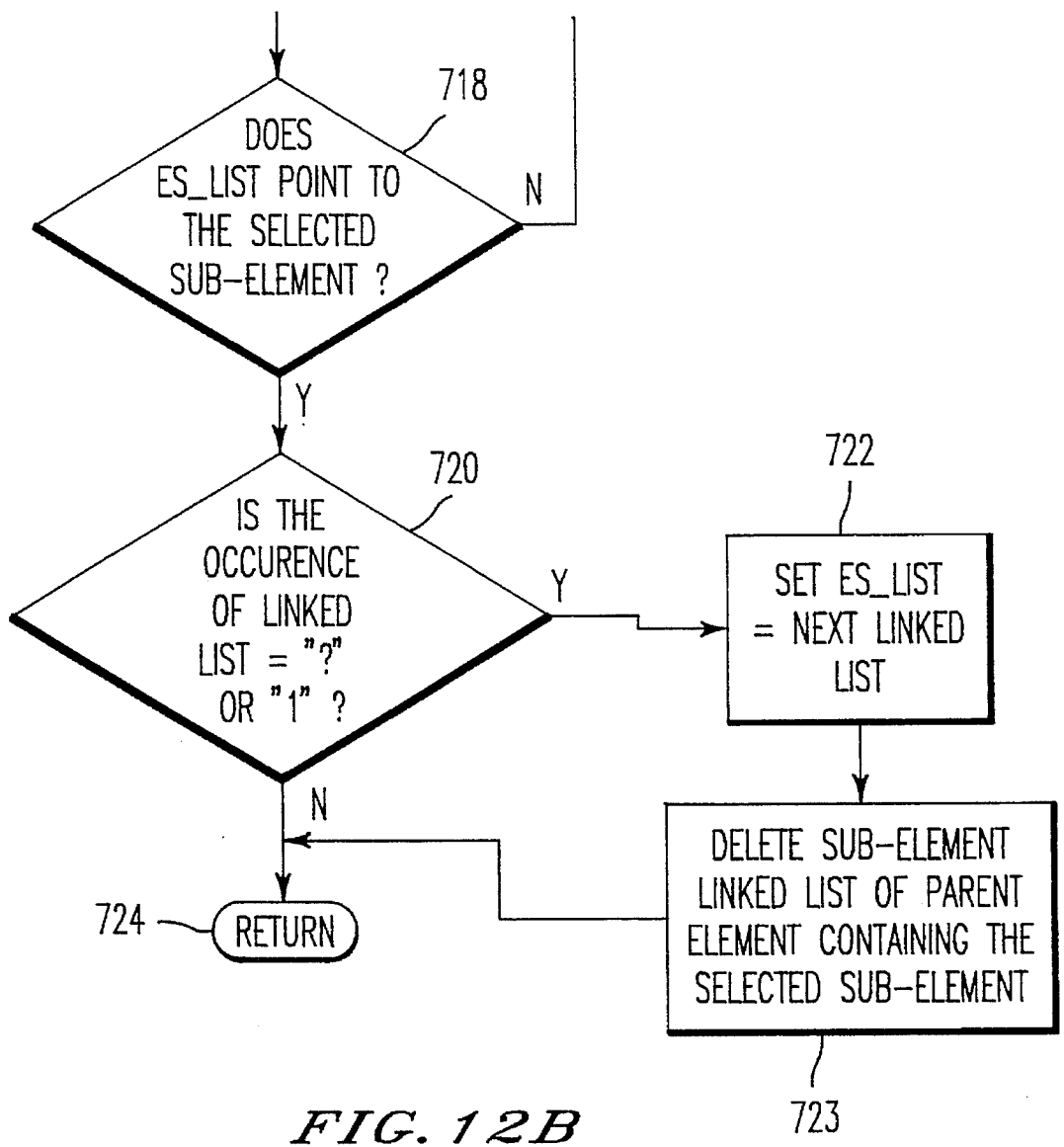

Turning now to FIGS. 12A and 12B for a complete illustration of how the sub-element linked list of the element stack of the parent element is processed in Step 578, step 702 examines the declaration of the parent element to determine if it is equal to "choice" or "doctype". If the declaration is choice or doctype, flow proceeds to step 703 where the pointer to ES_LIST of the parent entry in the element stack is set equal to null. The pointer is set to null because for a choice or doctype declaration, there is only one sub-element which can appear in the hierarchy one level under the parent element and as this element has just been selected, there can be no more sub-elements selected under the parent element. From step 703, flow returns to FIG. 10A.

If step 702 determines that the declaration of the parent element is not choice, the declaration is examined to determine if it is equal to "no declaration" in step 705. If the declaration is equal to no declaration, flow proceeds to step 706 where the occurrence of the parent element is examined to determine if it is equal to "?" meaning zero or once or "1" meaning once. If the occurrence is "?" or "1" flow proceeds to step 703 where the pointer to ES_LIST of the parent entry in the element stack is set equal to null. If the occurrence is not equal to "?" or "1" flow returns to the process illustrated in FIG. 10A.

If step 705 determines that the declaration is "no declaration," there is only one subordinate structure element. If the occurrence in the sub-element linked list containing the current element is either "?" or "1," and a sub-element is chosen, there are no more sub-elements to be selected or repeated. Note that if the occurrence is examined in the sub-element linked list, there my be no need to keep track of the occurrence in the element stack.

If step 705 determines that the declaration is not "no declaration," flow proceeds to step 708 where the declaration is examined to determine if it is equal to sequence or implicit sequence. If the declaration is not equal to sequence or implicit sequence, the declaration is not choice, no declaration, sequence, or implicit sequence and the pointer to ES_LIST is not to be modified and flow proceeds to step 710 which returns the process to FIG. 10A. If the declaration is equal to sequence or implicit sequence, the pointer to ES_LIST must be modified to delete the line data linked lists of the parent element in the element stack which are before the selected sub-element. Step 712 sets TEMP equal to the pointer ES_LIST. Step 714 sets ES_LIST equal to the next sub-element linked list data structure of the element stack. Step 716 deletes the data structure pointed to by the temporary pointer TEMP.

The first sub-element linked list data structure pointed to by the parent element in the element stack has just been deleted and flow proceeds to step 718 to determine if ES LIST now points to the selected sub-element. If it does not, there are additional sub-element linked lists between the element stack and the sub-element linked list of the selected sub-element and the loop of steps 712, 714, 716, and 718 are repeated until step 718 determines that ES LIST points to the selected sub-element.

Once step 718 determines that ES_LIST points to the selected sub-element, the occurrence of the selected sub-element in the sub-element linked list of the parent element in the element stack is examined to see if the occurrence is equal to "?" or "1." If the occurrence is either "?" or "1,"

flow proceeds to step 722 where the pointer ES LIST is set to the next sub-element linked list of the parent element in the element stack. The flow then proceeds to step 723 where the sub-element linked list of the parent element which contains the selected sub-element linked list is deleted because the occurrence of the selected sub-element indicates that the element cannot occur more than once. Flow then returns to FIG. 10A.

After the execution of the flowchart in FIGS. 12A and 12B, flow proceeds from step 578 of FIG. 10A to process B illustrated in FIG. 10B. In FIG. 10B, step 584 makes the selected sub-element the current element. At the present time, processing of information pertaining to the parent element is complete and therefore the sub-element is made the current element in step 584. Step 586 examines if there are any attributes for the current element (the selected sub-element). If there is one or more attributes, flow proceeds to step 588 where the attribute table in FIG. 7 is examined to determine the characteristics of the attribute(s) and the default value of the attribute(s). Step 590 accepts the input from the user regarding the attribute data. If the attribute always takes the default value, it will not be necessary to prompt the user for the value of the attribute as the attribute can be set to the default value. If an element has more than one attribute, steps 588 and 590 are repeated for each of the attributes of the element.

From steps 586 and 590, step 592 searches for the current element in the Element Table illustrated in FIG. 5. Step 593 pushes the current element onto the element stack. Step 594 generates the linked lists of the element stack for the current element using the sub-element linked list of the element table. Step 596 then adds the current element to the line data linked lists using the line data linked list illustrated in FIG. 9. If there is more than one attribute for a particular element, there will be a separate line data linked list for each attribute. The element name will appear on only the first line in the file for the element and not on the subsequent lines containing the attribute information. However, the element name will appear in the line data linked list data structure of each of the attributes. Step 598 then displays the sub-element list for the user to select using the sub-element linked list of the current element. Flow then proceeds to A illustrated in FIG. 10A and step 572 is executed which prompts the user for input. The process of FIGS. 10A and 10B is then repeated.

If step 576 determines that the input is a user command, flow proceeds to the right of step 576 to step 580. Step 580 calls the User Commands Handler which is illustrated in FIGS. 11A, 11B and 11C.

Figure 11A:
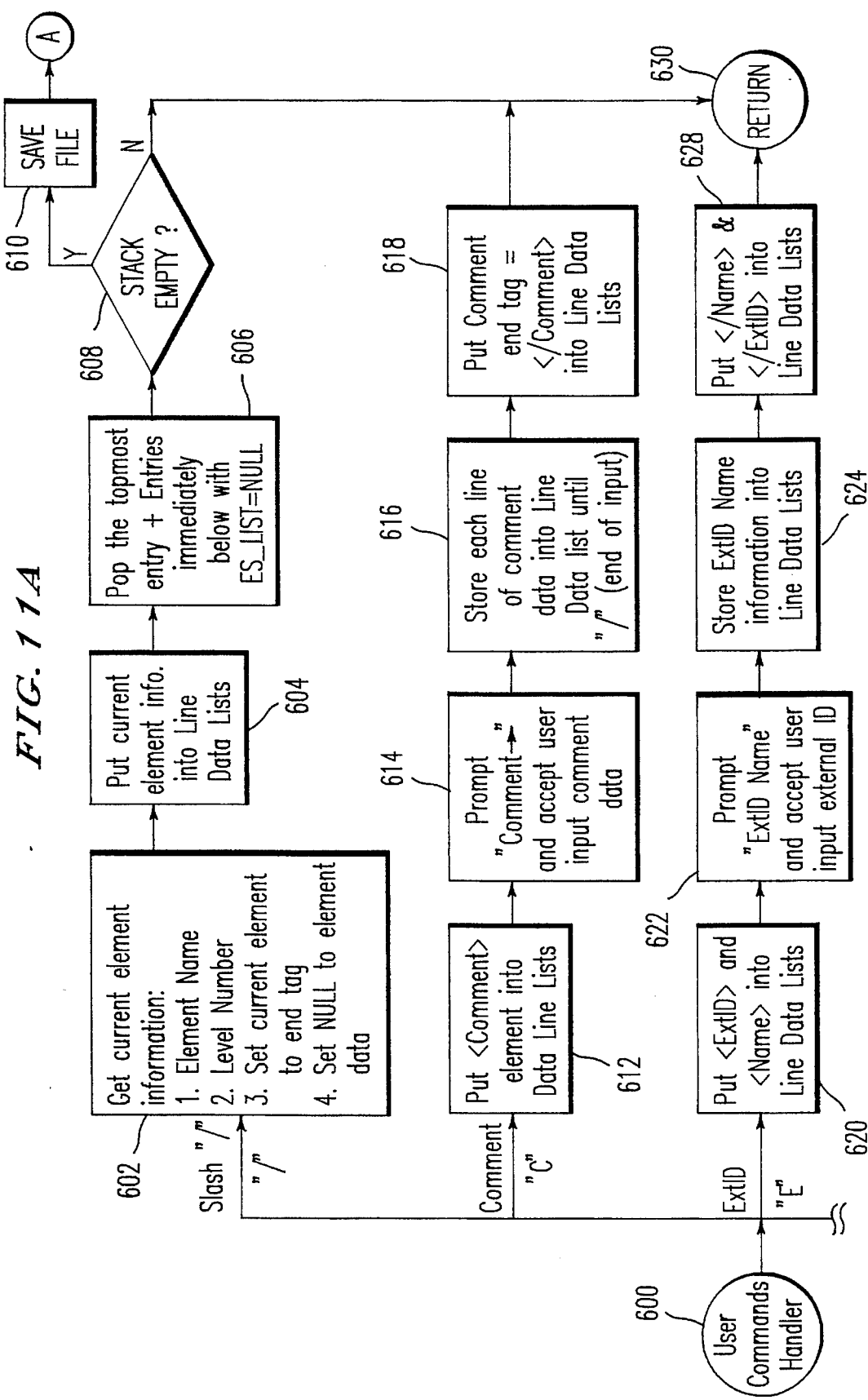
FIGS. 11A, 11B and 11C illustrate the process used by the user commands handler of the present invention.
Figure 11B:
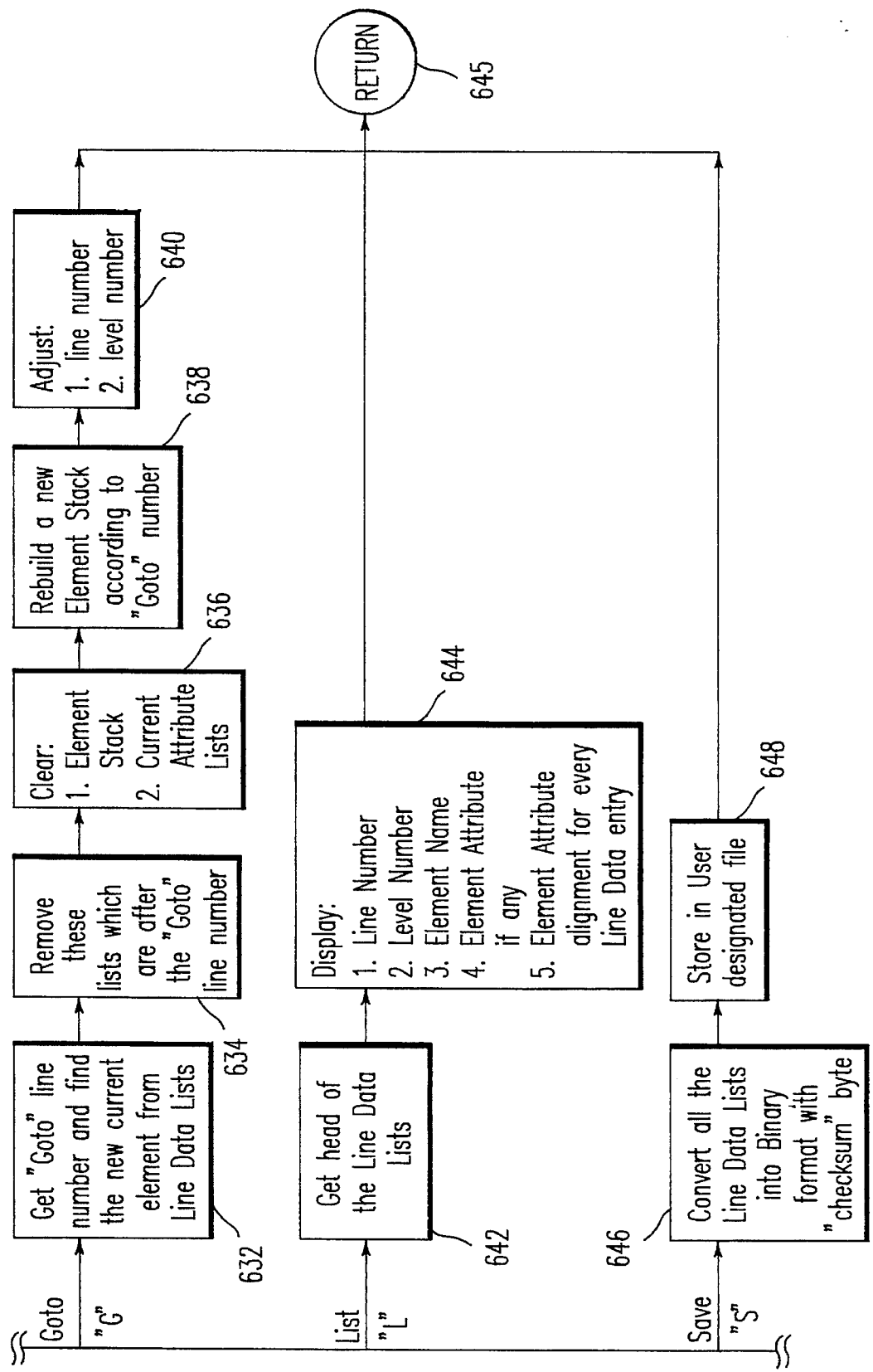
Figure 11C:
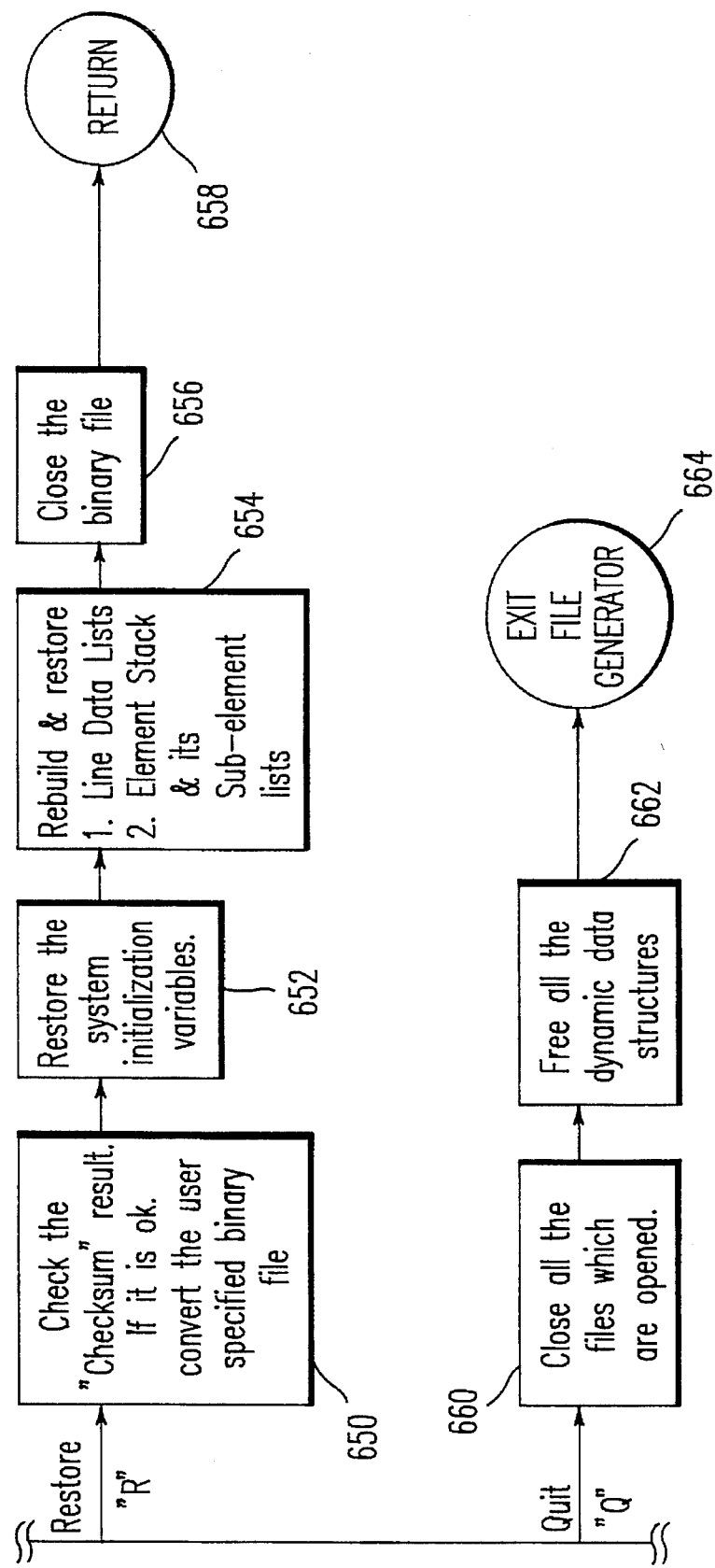

FIGS. 11A, 11B and 11C illustrate how each of the user commands are to be processed. If the user command is a "/", the current element being processed is to end by inserting an end-tag for the current element at the end of the line data linked list.

Step 602 gets the current element information which includes the current element name, the level number, determines the end-tag of the current element, and sets the element data equal to null so that the end tag does not have any data in the line data linked lists in step 604.

Step 604 puts the information obtained in step 602 into a new line data linked list. The topmost entry and entries immediately below the topmost entry with ES_LIST equal to null are popped off the element stack in step 606. Step 608 determines if the element stack is empty and if it is, flow proceeds to step 610 where the file is saved and flow proceeds to process A illustrated in FIG. 10A. If the stack is not determined to be empty in step 608, flow proceeds to step 630 where flow returns to step 582 illustrated in FIG. 10A.

When the user enters the "C" Comment command, step 612 puts the comment tag <COMMENT> into the line data linked list. The user is then prompted to enter the comment in step 614. Step 616 stores each line of comment data into the line data linked list until the "/" command is entered, indicating the end of the comment. After the "/" command is entered, the comment end-tag </COMMENT> into the line data linked list. Flow then returns to the process illustrated in FIG. 10A.

If the user enters the command "E" ExtID command, step 620 puts the <EXTID> and <NAME> into the line data linked list. Step 622 then prompts the user to enter the "ExtID Name" and accepts the user input of the External ID. Step 624 stores the External ID and Name information into the line data linked list. Step 628 then puts the end tags for the Name and External ID elements into the line data linked list. Flow then returns to the process illustrated in FIG. 10A.

If the user enters the "G" Goto command, step 632 prompts the user for the line number to go to and traces the line data linked list from the beginning until the line number which was inputted is found. Step 634 removes the line data linked lists which are after the Goto line number. Step 636 then clears the element stack and the current attribute lists. The current attribute list is created when the user selects an element with one or more attributes. The attribute list is created by scanning the sub-element linked list for sub-elements having the TYPE 210 entry as an attribute. The attribute list is used to construct the line data linked list.

Step 638 rebuilds a new element stack using the line data linked list from the first line up until the Goto line number. Step 640 adjusts the line number and level number to be the line number and level number of the last element in the element stack and flow returns to the process illustrated in FIG. 10A.

When the user enters the "L" List command, step 642 determines the head of the line data linked list and step 644 displays the line number, level number, element name, element attributes if any using a proper alignment for every line data entry. Flow then returns to the process illustrated in FIG. 10A.

When the user enters the "S" Save command, step 646 converts each of the line data linked list data structures into a binary format and calculates a "checksum" byte. The binary format is a machine readable format and not directly human readable. For example, the integer 15 can be expressed using 8 bits as 00001111.

Step 648 then stores the binary format information including the checksum into a user designated file. Flow then returns to the process illustrated in FIG. 10A.

If the user enters the "R" Restore command, step 650 examines the checksum. If the checksum is proper, the binary file is converted to a cleartext format. Step 652 then restores the system and initializes the variables. Step 654 rebuilds and restores the line data linked list data structures and the element stack in its sub-element linked list data structures. Step 656 closes the binary file and flow returns to the process illustrated in FIG. 10A.

If the user enters the "Q" Quit command, step 600 closes all files which are open and step 662 frees all dynamic data structures which have been previously created. The file generator is then exited in step 664.

After flow returns from the User Commands Handler to FIG. 10A, step 582 displays the current element and its sub-element linked list for the user to select. Flow then proceeds to step 574 which inputs the user selection. The process of FIGS. 10A and 10B repeat as previously described.

Now that the example illustrated in FIGS. 2A–2N has been described, the data structures used by the present invention have been described, and the flowcharts illustrating the process of the invention have been described, the element stack and its sub-element linked list data structures will be described in FIGS. 13A–13N as the example illustrated in FIGS. 2A–2N is processed.

Figure 13A:
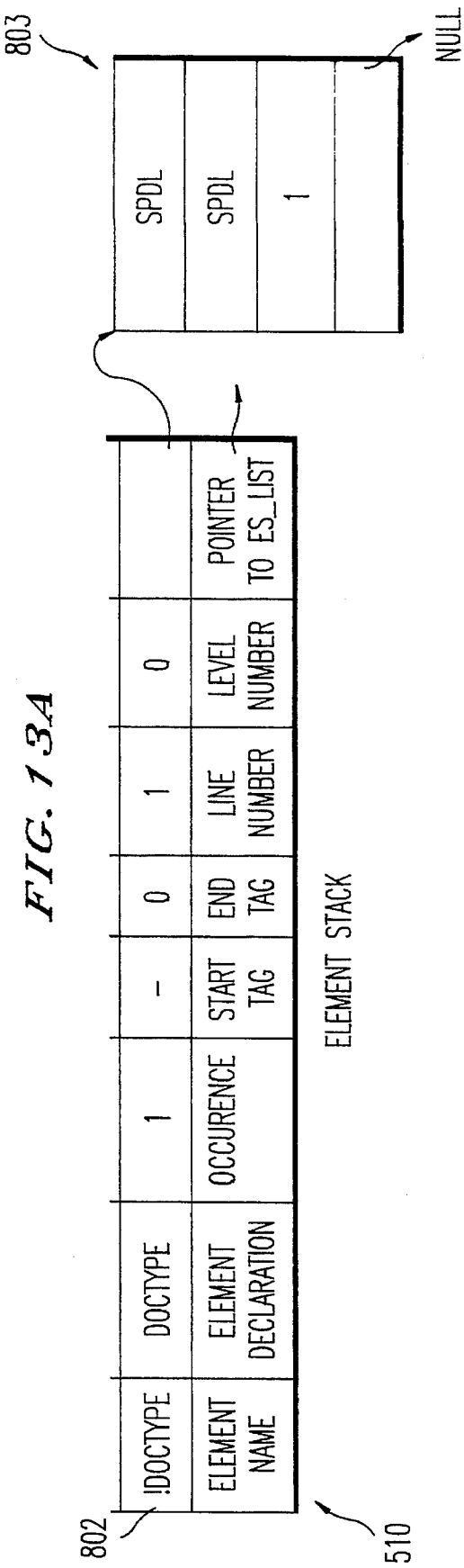
FIGS. 13A–13N illustrate the element stack as the document illustrated in FIG. 1 is being processed.

Turning now to FIG. 13A, when the user selects "1" to create an SPDL document, the first element of the generated file is the !DOCTYPE element. The !DOCTYPE element is pushed onto the element stack 510 and the declaration is DOCTYPE, the occurrence is 1, the start tag is optional, the end tag is required, the line number is 1 and the level is 0. The !DOCTYPE element is looked up in the element table illustrated in FIG. 5 and it is determined that it has one sub-element which is SPDL as illustrated in FIG. 6B and the sub-element linked list of the element stack is created for the !DOCTYPE element. The element stack and associated sub-element linked list data structure is as illustrated in FIG. 13A. Note that the !DOCTYPE element is the first element in the element stack and is an exception to the general flow charts illustrating the process of the invention. However, it suffices to know that whenever the !DOCTYPE element is selected, the element stack is created as illustrated in FIG. 13A.

The user of the file generator can now only select the SPDL sub-element as this is the only sub-element under the !DOCTYPE element. In FIG. 2B, the user selects the SPDL structure element in step 574 of FIG. 10A and step 576 determines that the input is a sub-element and flow proceeds to step 578. Step 578 calls the process illustrated in FIGS. 12A and 12B where the pointer ES LIST for the !DOCTYPE element entry in the element stack is set to null. In step 702, the declaration is determined to be DOCTYPE and therefore, step 703 sets the pointer to ES LIST of the !DOCTYPE element equal to null.

Figure 13B:
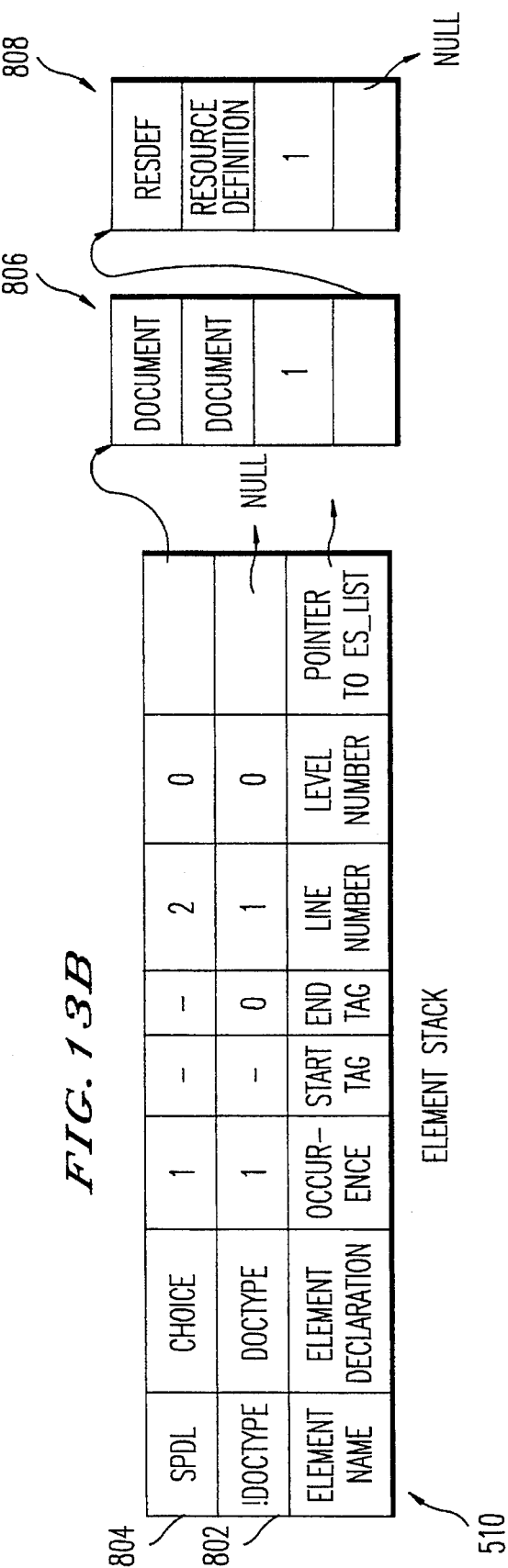

From the flowchart illustrated in FIGS. 12A and 12B, flow proceeds to step 584 in FIG. 10B where the selected sub-element SPDL is made the current element. The SPDL element is then looked up in the element table illustrated in FIG. 5 where it is determined not to have any attributes. Flow then proceeds to step 592 where the pointer to the sub-element linked list of SPDL is determined. SPDL is then pushed onto the top of the element stack in step 593 and the sub-element linked lists for the SPDL element are generated in step 594 to create the linked list data structures 806 and 808 illustrated in FIG. 13B. Step 596 then adds the SPDL element to the line data linked list data structures and step 598 then displays the list of sub-elements to be selected as illustrated at the top of FIG. 2C.

Figure 13C:
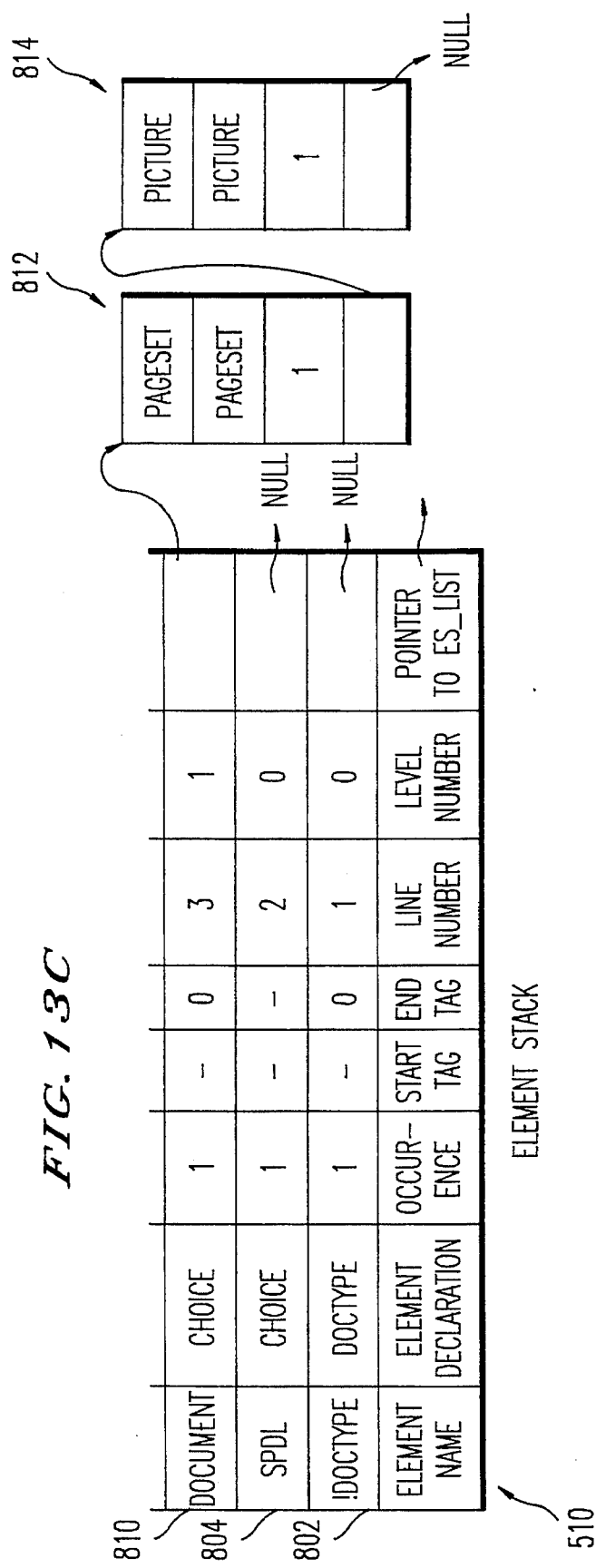

In FIG. 2C, it is seen that the user has the choice of the document or resource definition structure element. The user selects the document sub-element and flow proceeds from step 574 to step 576 and to step 578 in FIG. 10A. In step 702 of FIG. 12, the declaration of the parent element SPDL is checked and it is equal to choice. Therefore, flow proceeds to step 703 in FIG. 12A and the pointer to ES LIST of SPDL is set equal to null. Flow then returns to step 704. Flow proceeds to process B illustrated in FIG. 10B and the document element is made the current element. The document is determined not to have any attributes in step 586 and flow proceeds to step 592 where the pointer to ES LIST is determined. In step 593, the document element is pushed on top of the element stack and the sub-element linked lists for the document element are generated to obtain the pageset 812 linked list data structure and the picture 814 linked list data structure as illustrated in FIG. 13C. Step 598 then displays the sub-element lists for the document element which include the pageset and picture elements as illustrated at the top of FIG. 2D.

Figure 13D:
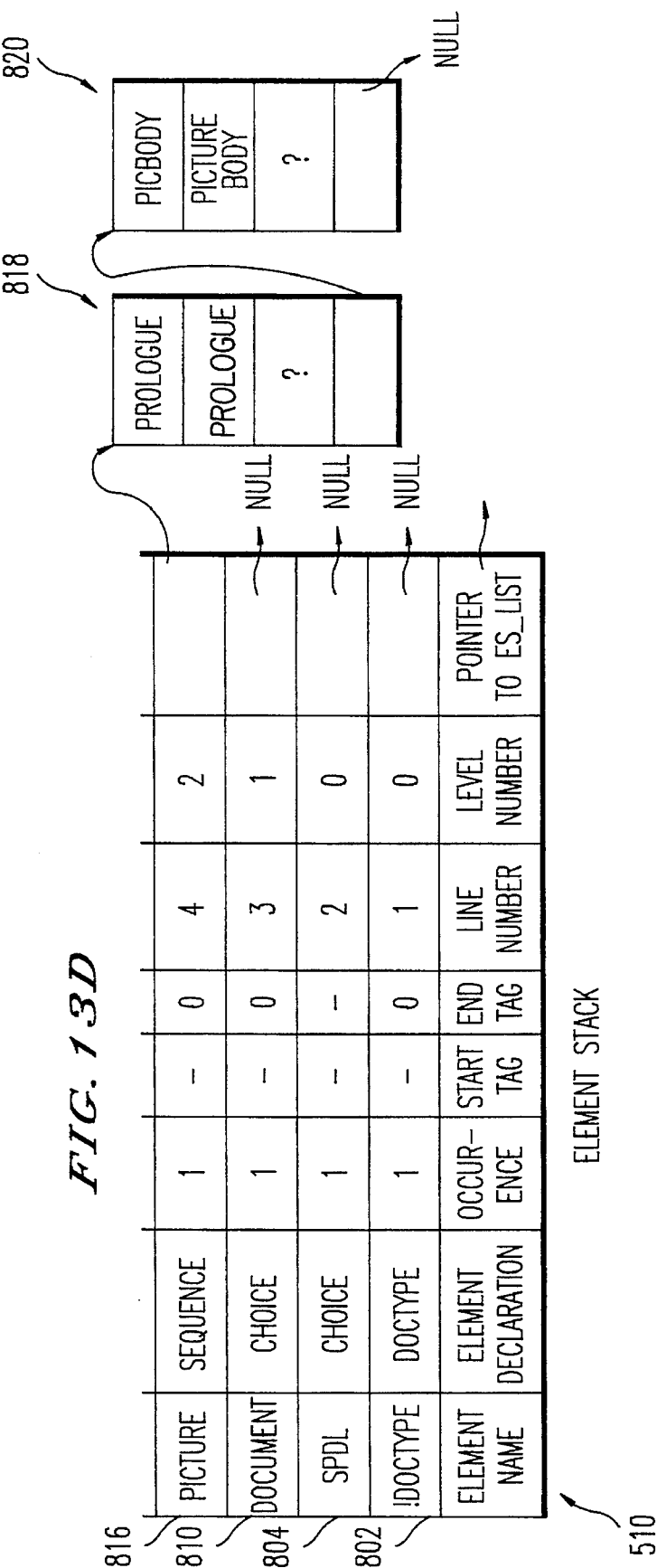

In FIG. 2D, the user selects the picture element and as the declaration for the document element in the element stack is choice, the pointer to ES LIST of the document element is set to null in step 703 of FIG. 12. Then, step 586 determines that the picture element has two attributes by examining the element table in FIG. 5. As both attributes for the picture element are default, the user is not prompted for this information. The picture element and its associated sub-element linked list are then as displayed in FIG. 13D.

Figure 13E:
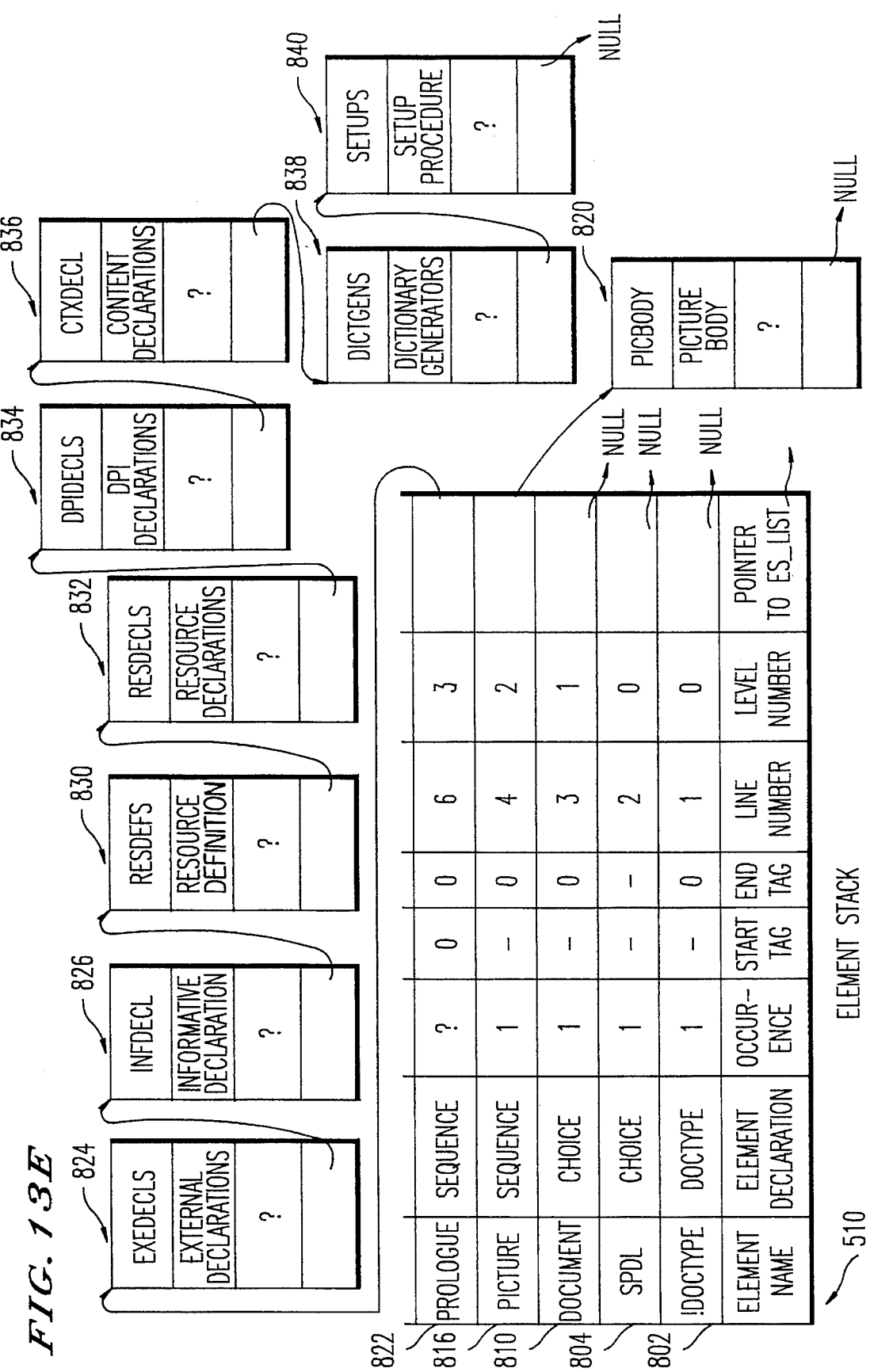

In FIG. 2E, the user selects the prologue structure element. As the declaration of the parent element, picture 816 is a sequence, and the prologue sub-element has been selected, steps 712, 714, 716, and 718 delete the prologue sub-element data structure 818 of FIG. 13D. The prologue element and its associated sub-element data structures are then pushed onto the element stack and are as illustrated in FIG. 13E.

Figure 13F:
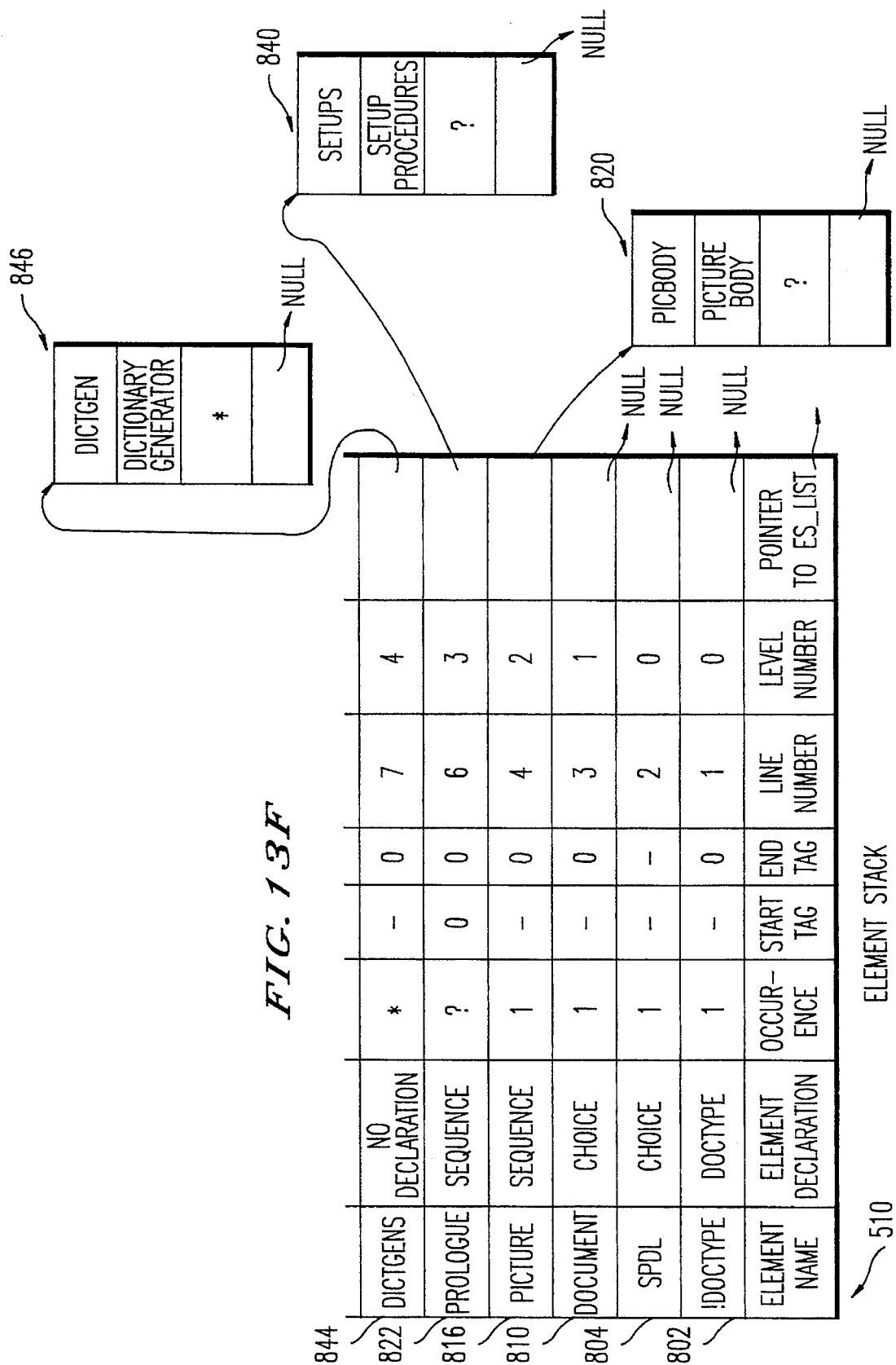

FIG. 13F illustrates the element stack after the dictionary generators sub-element has been selected. The sub-elements before the dictionary generators element in FIG. 13E have been deleted and only the set-up procedure's sub-element linked list data structure 840 exists in FIG. 13F.

Figure 13G:
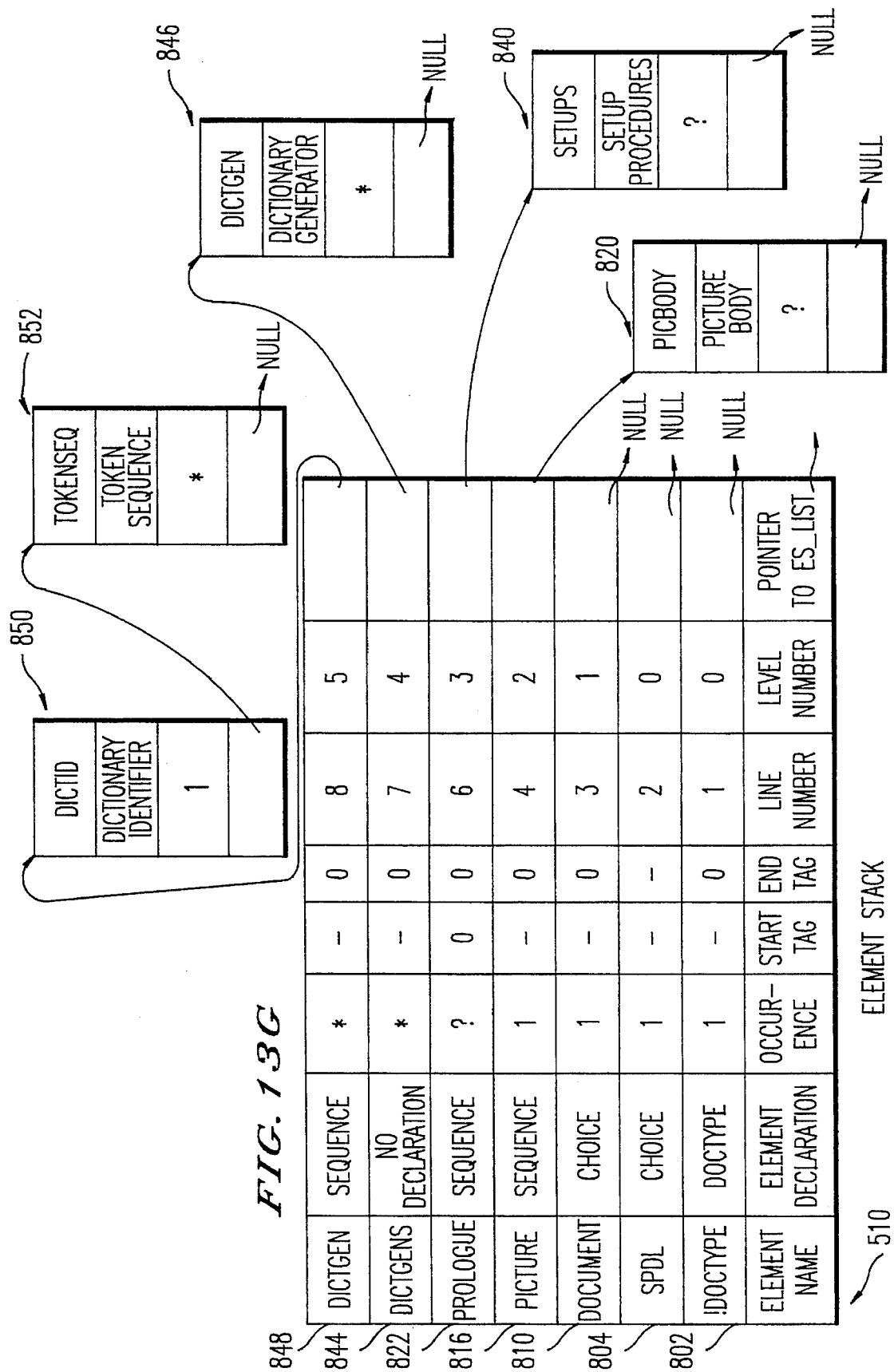

In FIG. 13G, the user selects the dictionary generator element 848 which is pushed onto the stack and its sub-element data structures dictionary identifier 850 and token sequence 852 are created.

Figure 13H:
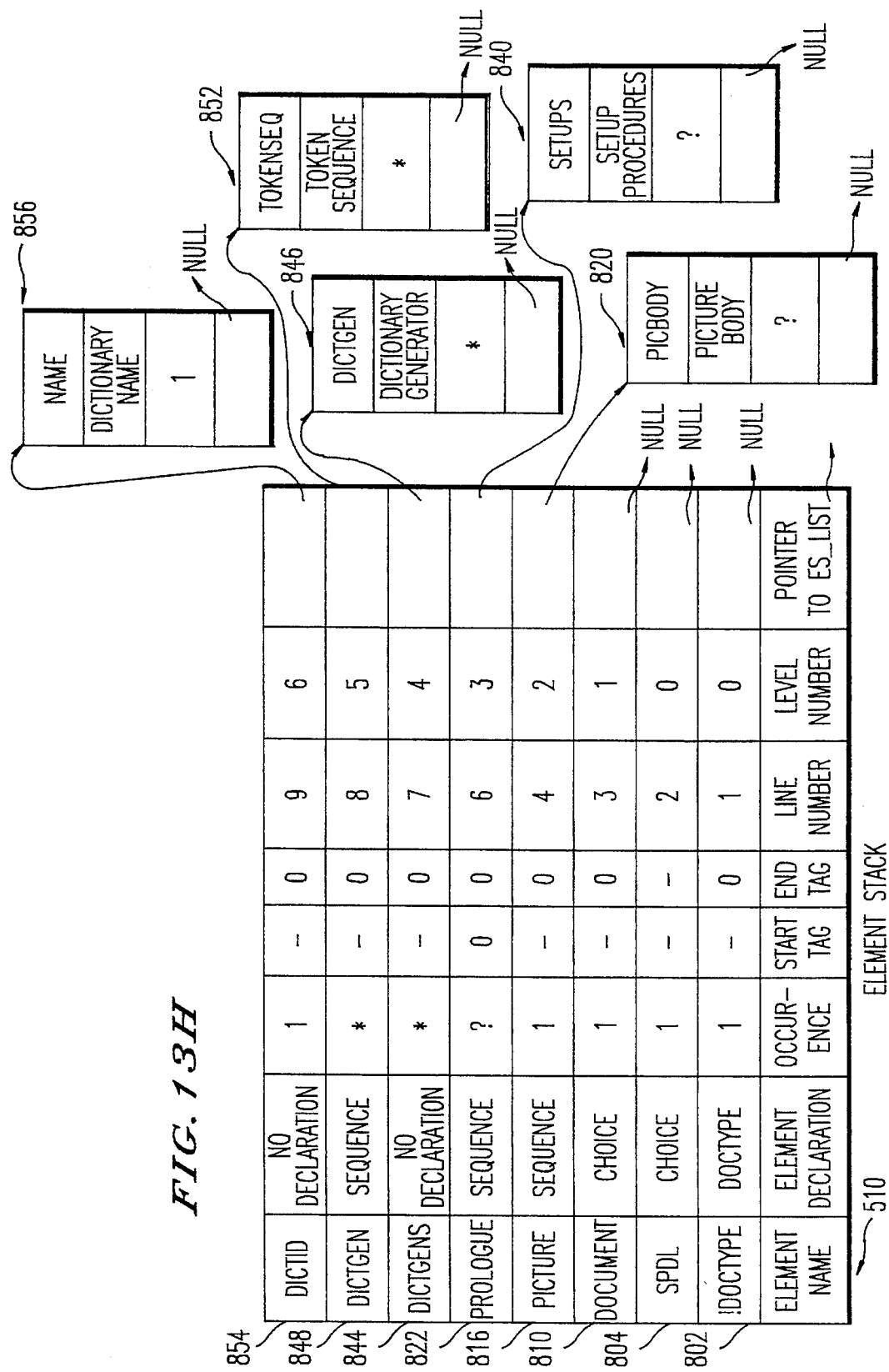

In FIG. 13H, the user has selected the dictionary identifier sub-element and as the dictionary generator element 848 is a sequence, the dictionary identifier element 850 has been deleted as a sub-element of the dictionary generator 848.

Figure 13I:
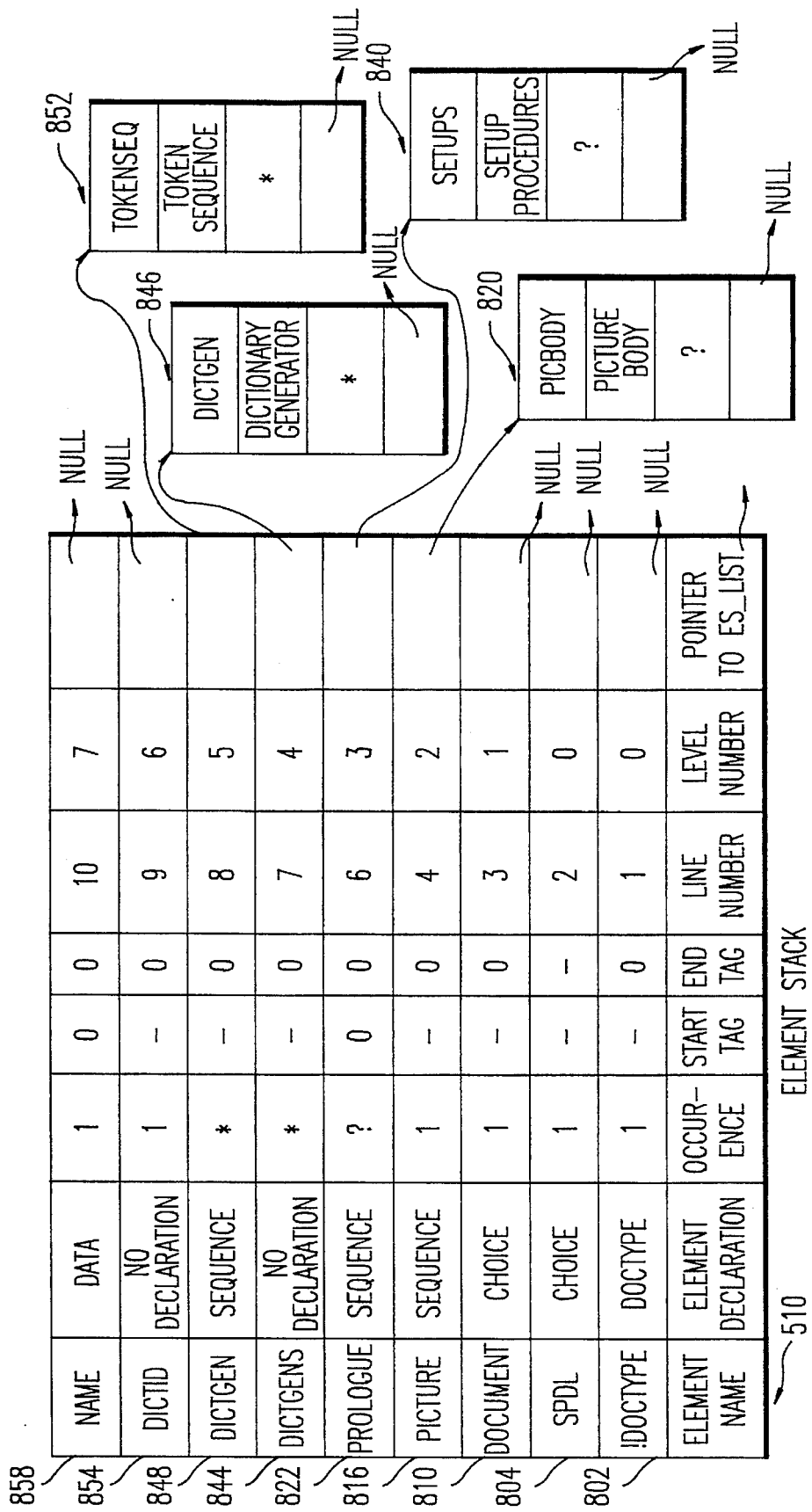

In FIG. 13I, the user selects the name sub-element and as the declaration for the dictionary identifier 854 is no declaration and its occurrence is 1, steps 705 and 706 cause the pointer to ES_LIST of the dictionary identifier to be set to null in step 703. As seen in the element table illustrated in FIG. 5, the pointer to the sub-element linked list of the name structure element points to null and therefore the pointer to ES LIST for the name entry on the element stack points to null.

Figure 13J:
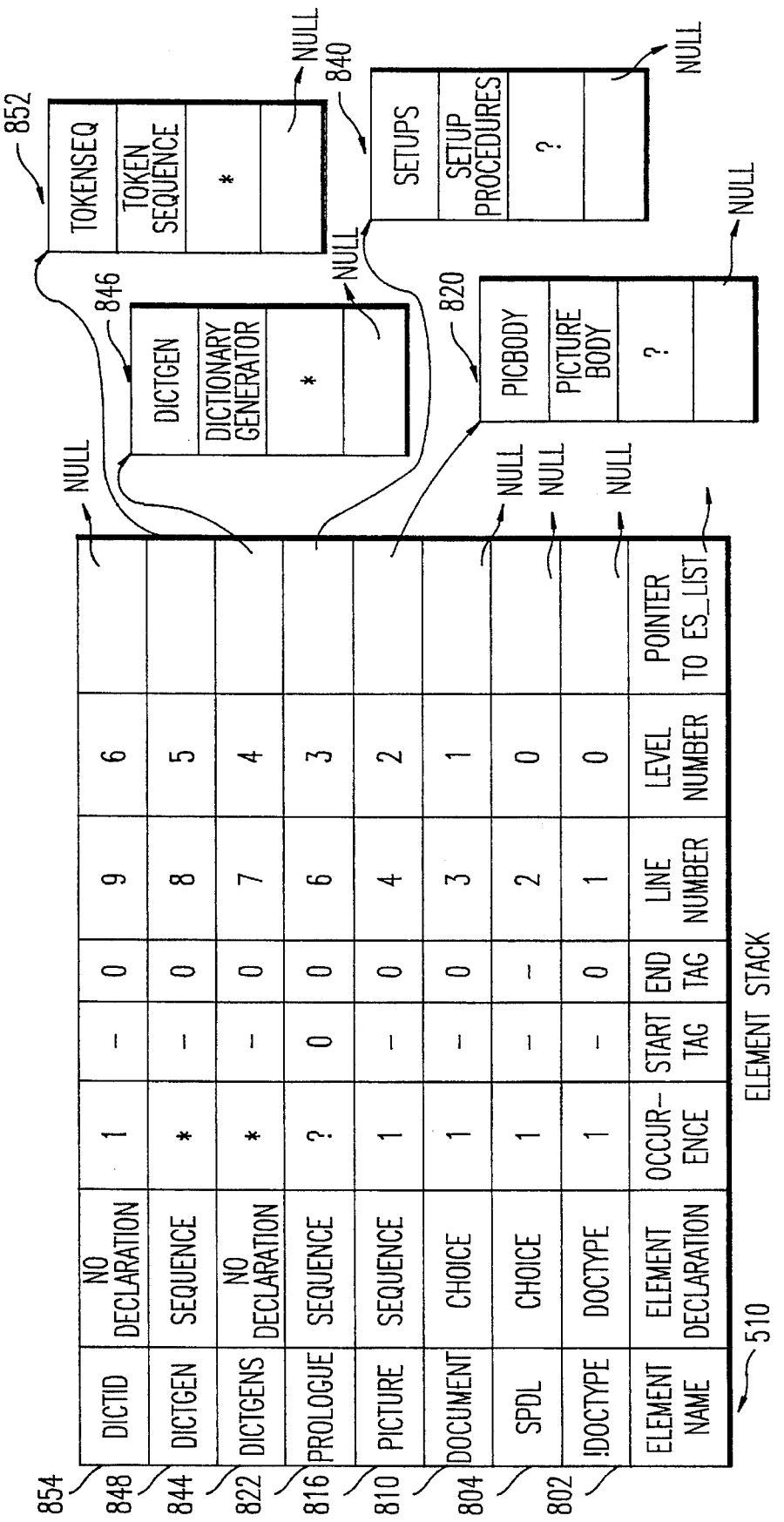

After the user enters the name "Alpha" in FIG. 2I, the name element ends along with the dictionary identifier element. The present invention realizes that these elements are to automatically end and there is no need for the user to enter the "/" command to signify the end of the elements. When the name element is finished, the element stack is as illustrated in FIG. 13J and then the dictionary identifier element automatically ends and the element stack is as illustrated in FIG. 13K.

Figure 13K:
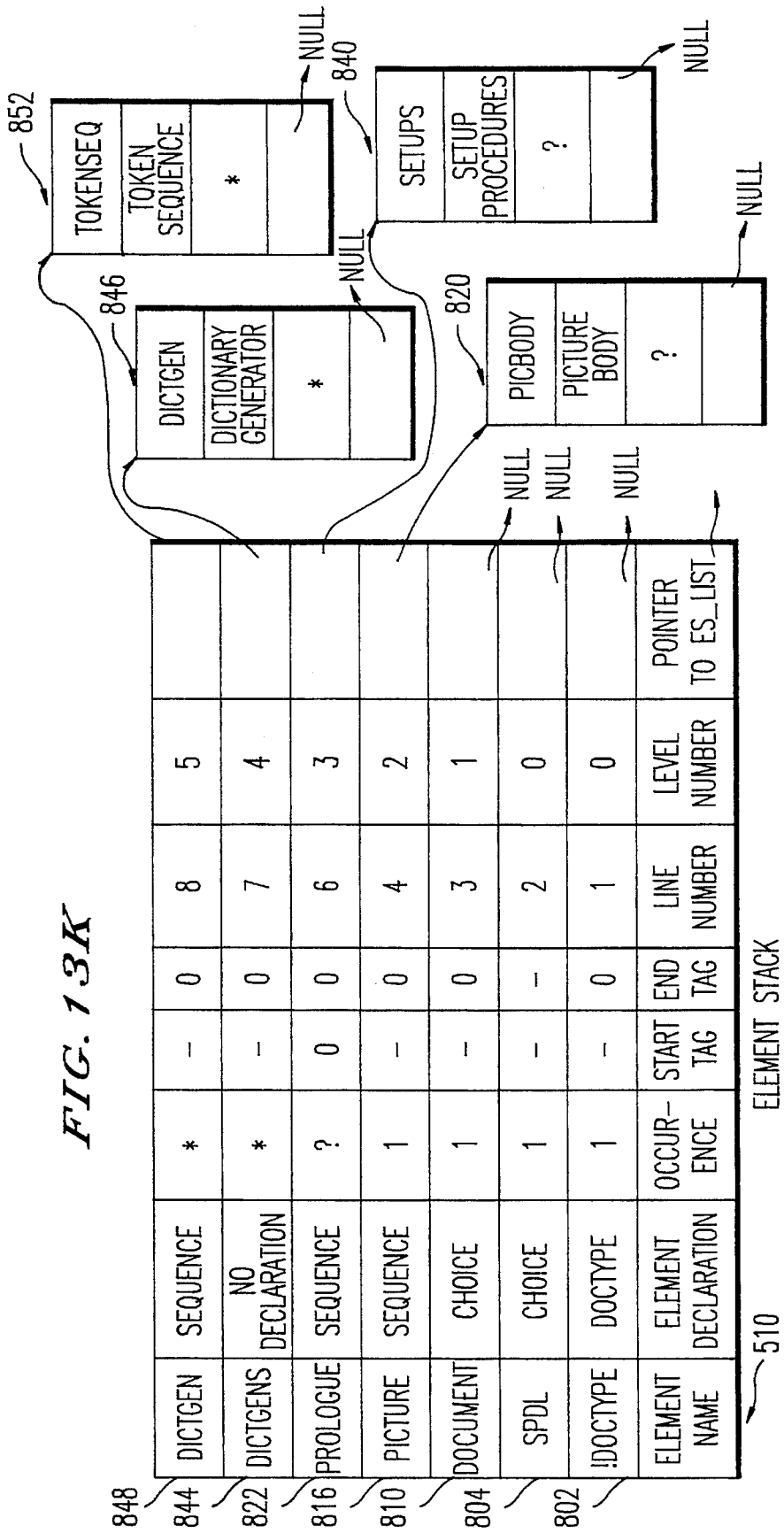
Figure 13L:
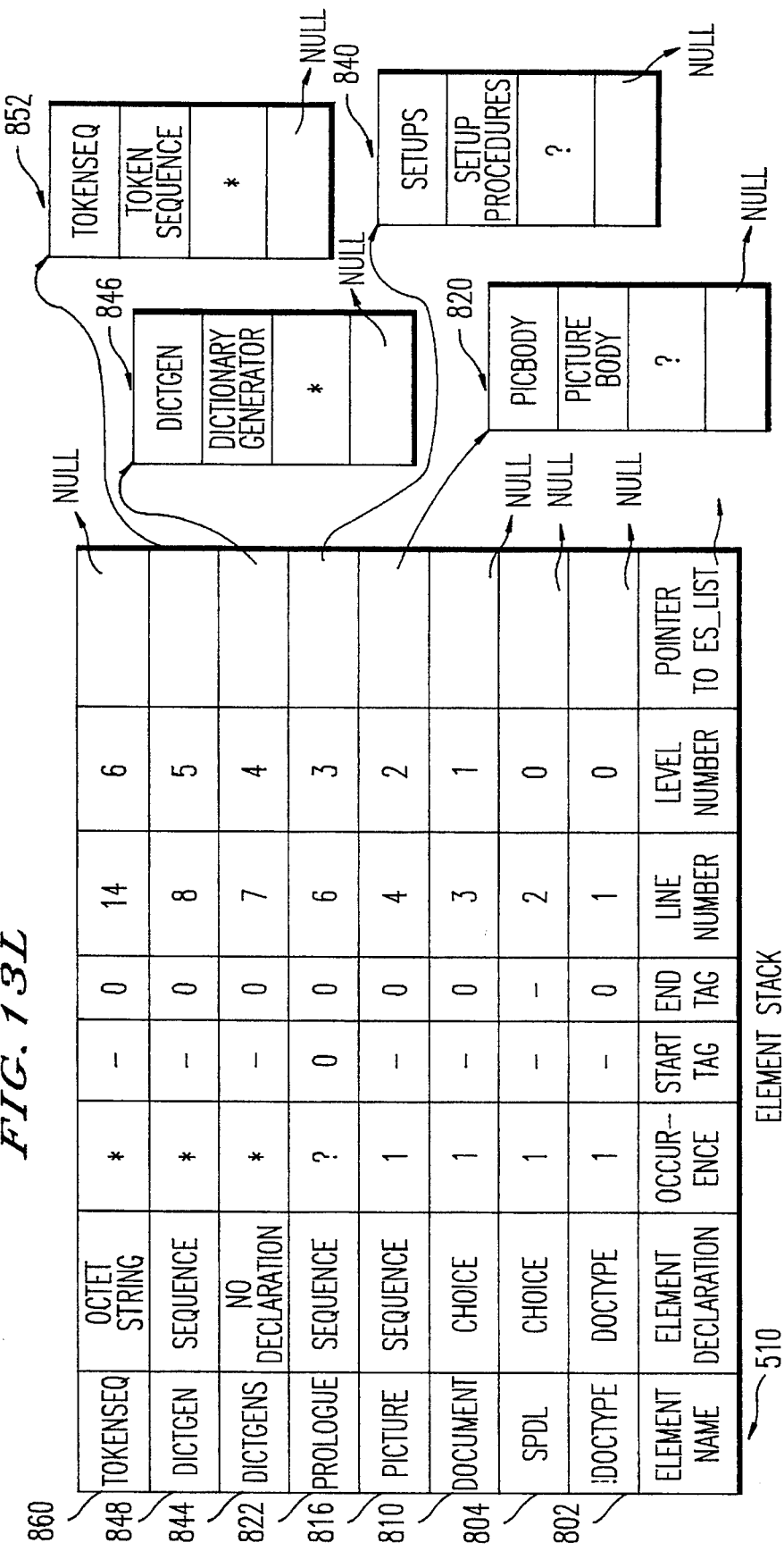

In FIG. 13K, it is seen that the only sub-element of the dictionary generator 848 is the token sequence 852. In FIG. 2J, it is seen that the user selects the token sequence sub-element and the token sequence element 860 is pushed on top of the element stack as illustrated in FIG. 13L.

Figure 13M:
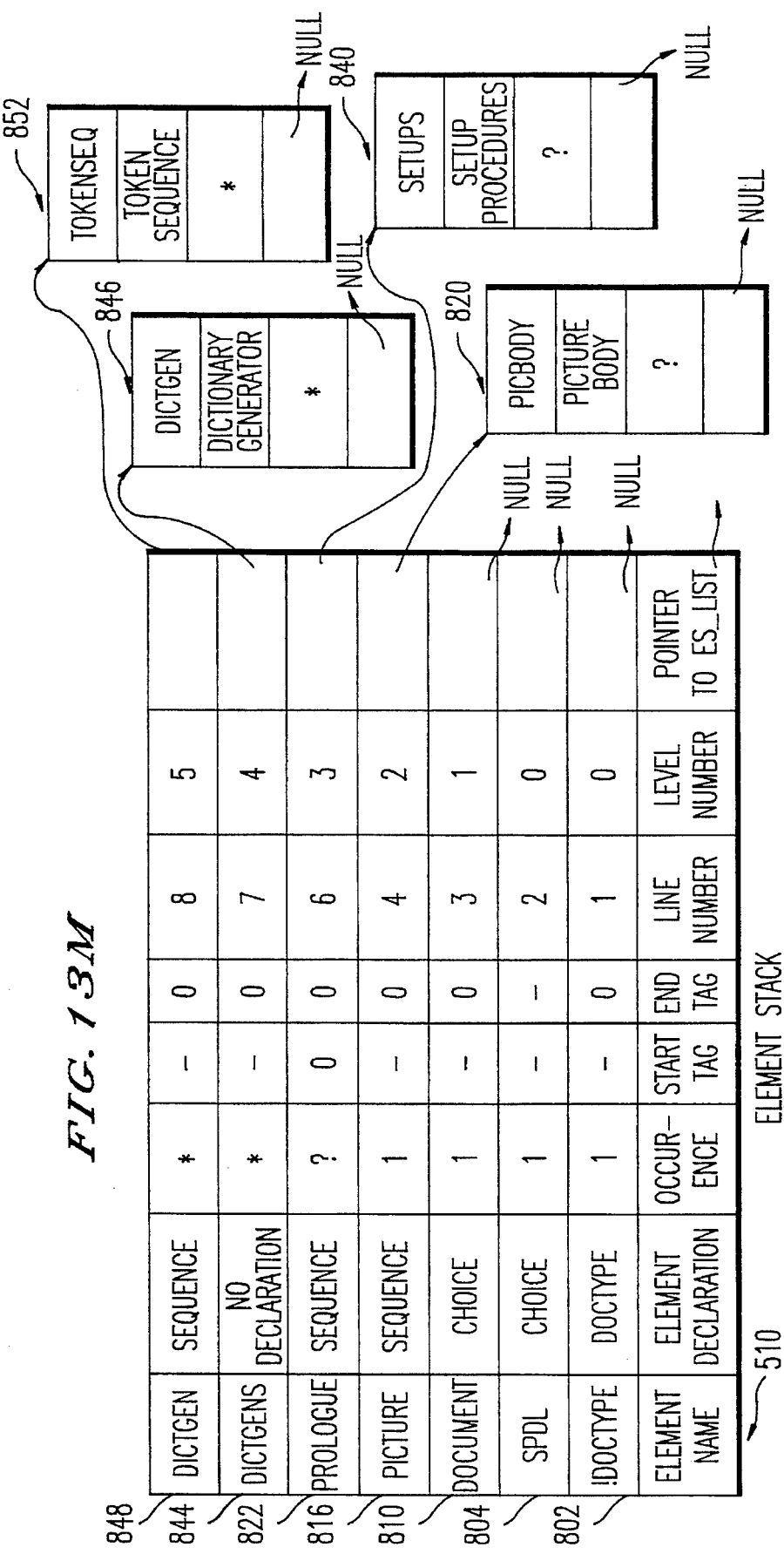

In the middle portion of FIG. 2J, the user enters the "/" command indicating the end of the token sequence 860 of the element stack and the token sequence 860 is popped off of the element stack and the element stack is as illustrated in FIG. 13M.

The dictionary generator is the current element and the user has the choice of the token sequence sub-element as illustrated in FIG. 2K. In FIG. 2K, the user selects the "/" command which generates an end tag for the dictionary generator element and the dictionary generator element is popped off of the element stack. The element stack is as illustrated in FIG. 13N.

Figure 13N:
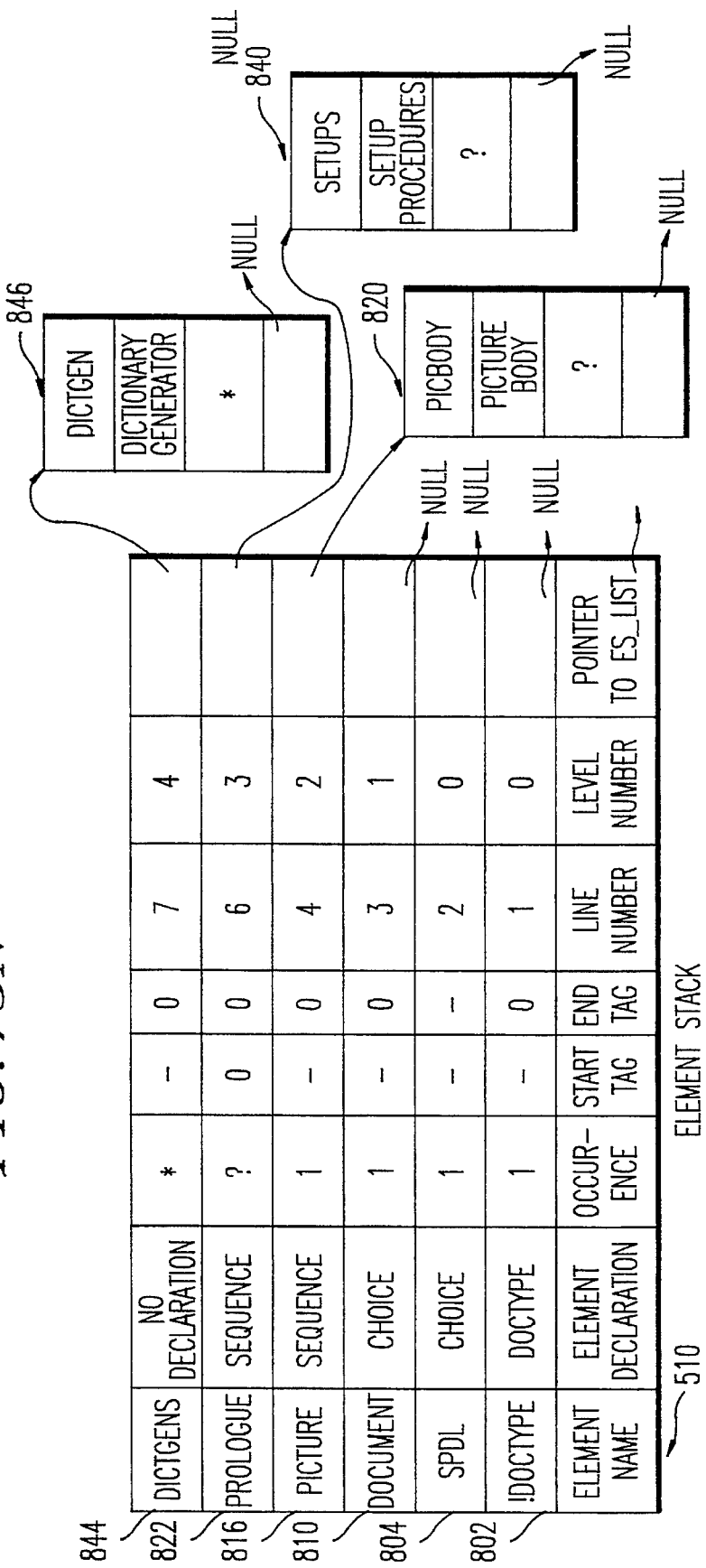

From FIGS. 13A–13N, the operation of the element stack and its associated sub-element link list data structures can be gained and for brevity's sake, the element stack is not illustrated as FIGS. 2L, 2M, and 2N are processed.

Figure 14A:
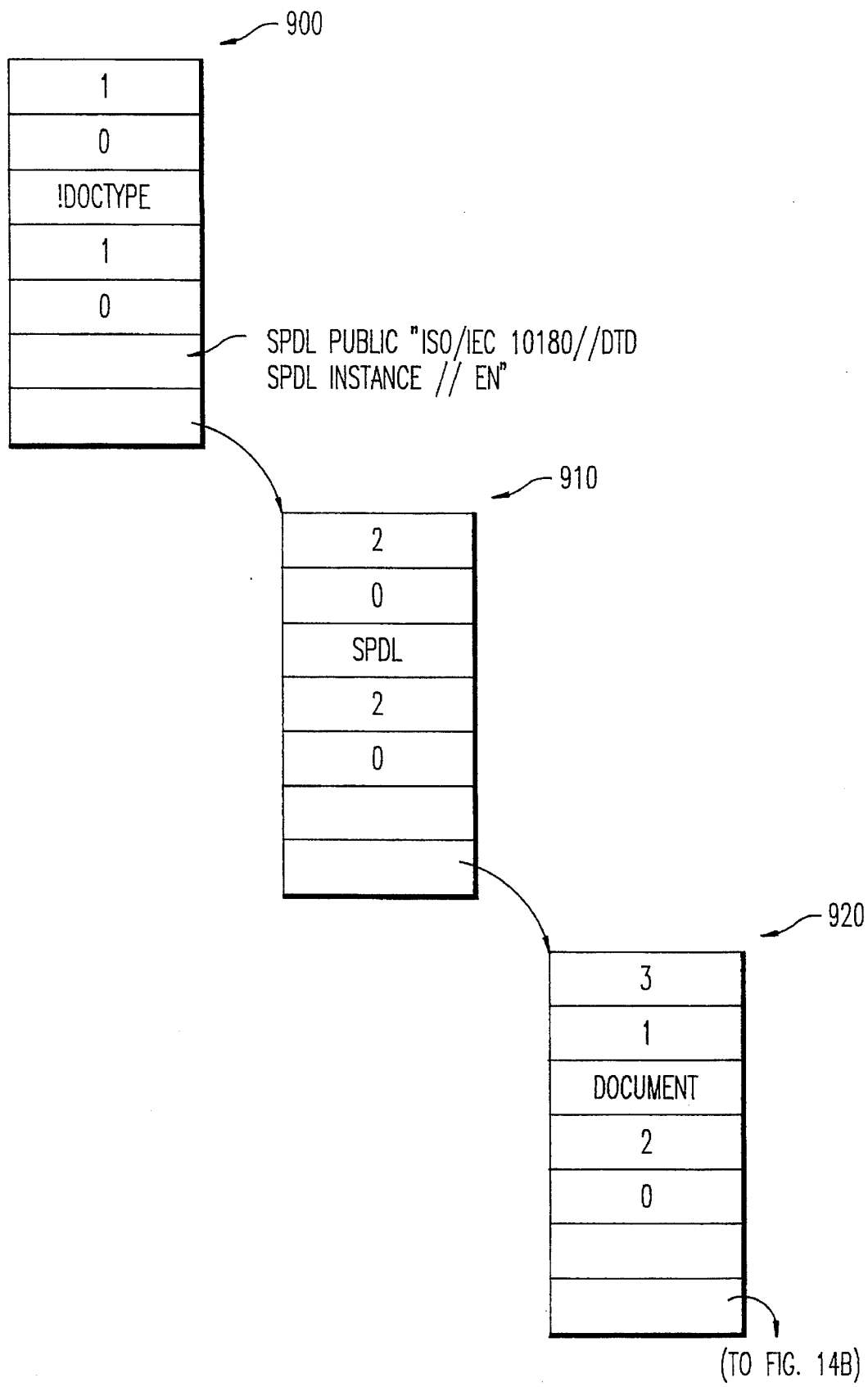
FIGS. 14A and 14B illustrate the line data linked list data structures created for the file illustrated in FIG. 1.
Figure 14B:
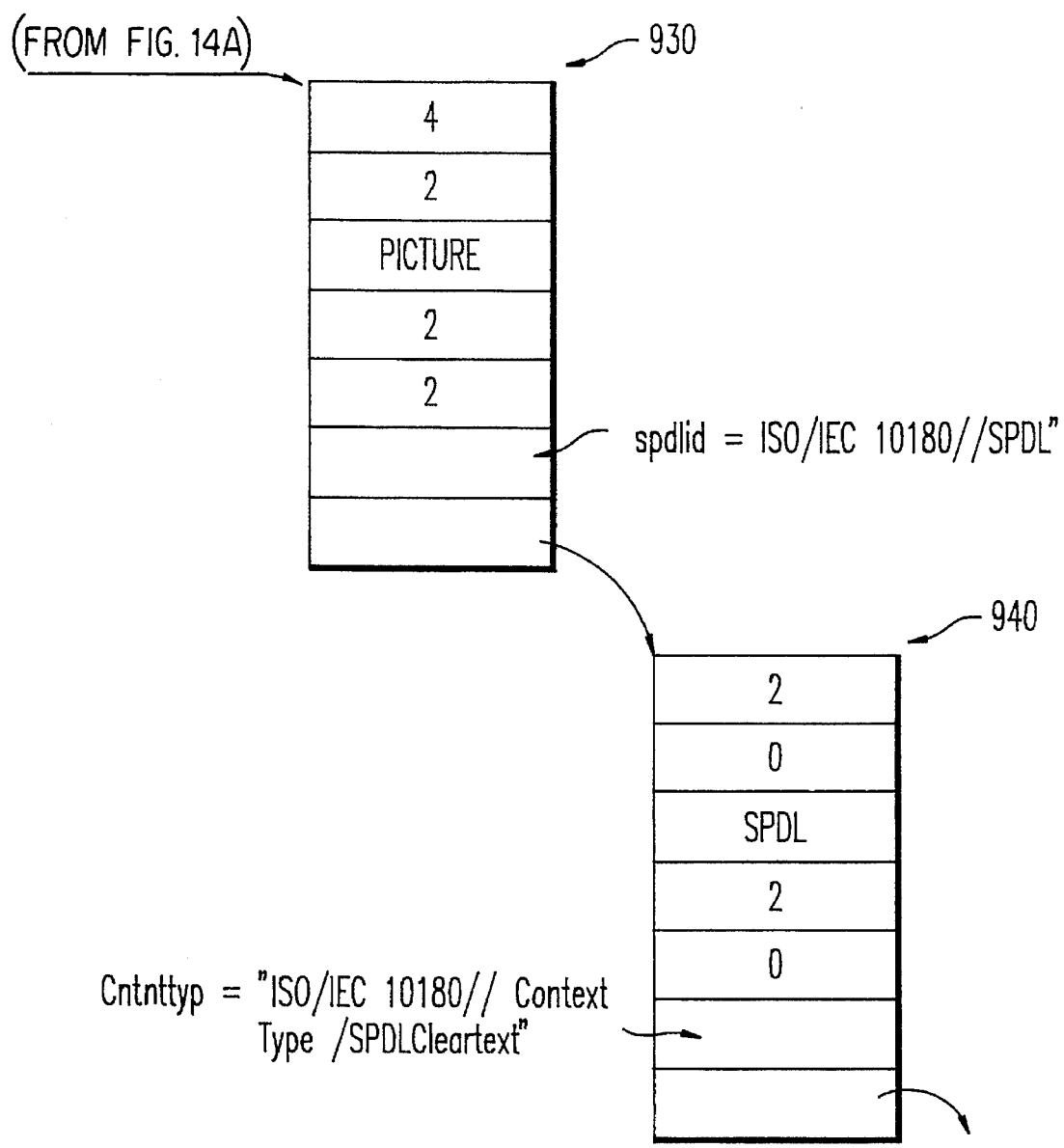

FIGS. 14A and 14B illustrate the line data linked list data structures for the first five lines of the SPDL file illustrated in FIG. 1. The fields of the line data linked list data structure are explained in FIG. 9. The line data linked list data structure 900 illustrated in FIG. 14A indicates the line number of the first line is 1, it is at the indentation level, it contains the information !DOCTYPE, its tag type is 1 indicating that the element is a !DOCTYPE, its attribute number is 0 indicating the attribute value is fixed, and the element data is SPDL PUBLIC "ISO/IEC 10180//DTD SPDL Instance//END."

Element 910 illustrates the line data linked list data structure for line 2, data structure 920 corresponds to line 3, data structure 930 corresponds to line 4, and data structure 940 corresponds to line 5.

The line data linked list data structures for the remaining lines of the document illustrated in FIG. 1 have not been illustrated in FIG. 14A or 14B for brevity's sake.

Figure 15:
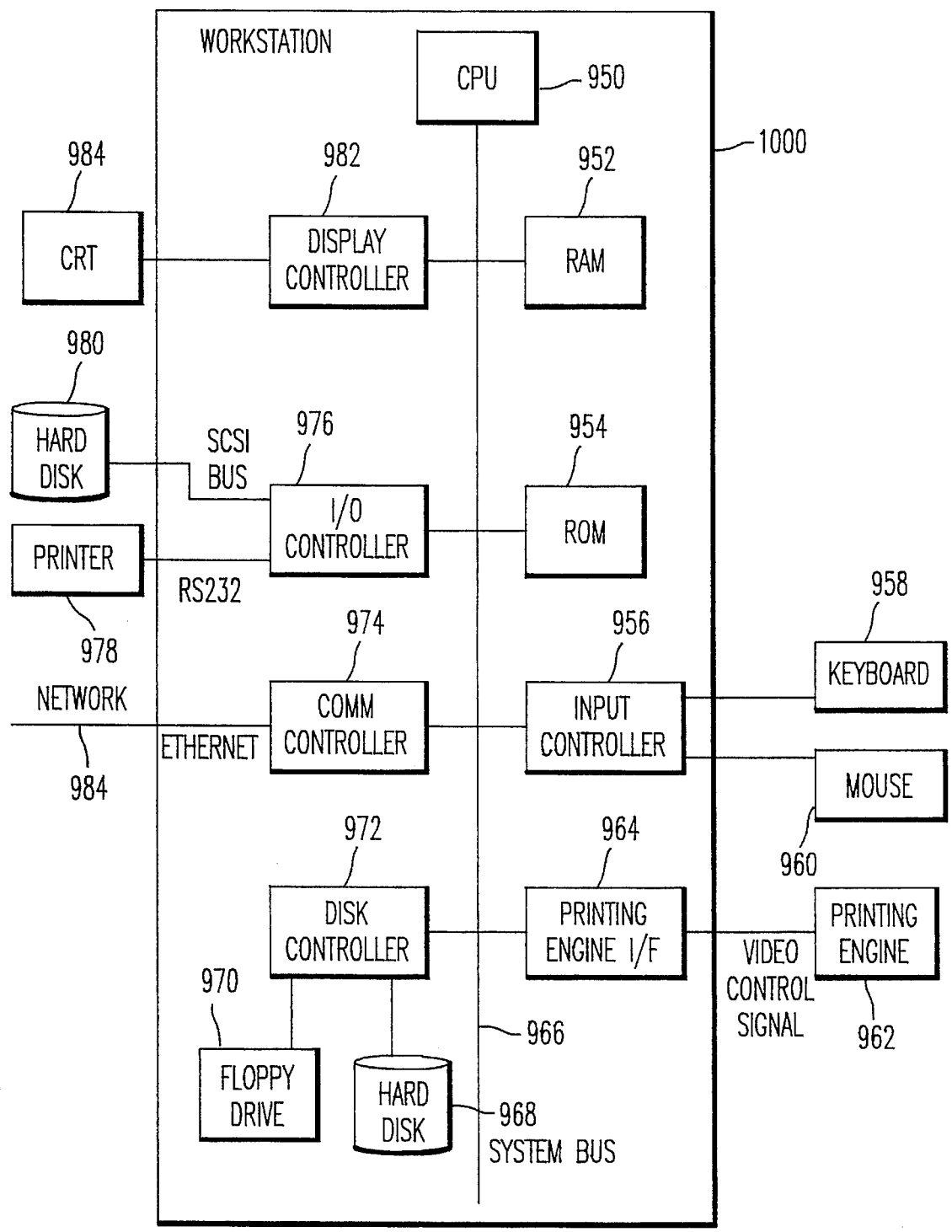
FIG. 15 illustrates an exemplary hardware diagram of a system used by the present invention.

FIG. 15 illustrates the makeup of a workstation 1000 which can be used to run the process of the present invention. Workstation 1000 contains CPU 950, RAM 952, ROM 954, input controller 956 connected to a keyboard 958 and a mouse 960. A printing engine interface is connected directly to a printing engine 962 which receives video and control signals for image data transmitted by the printer engine interface 964. The workstation further contains a disk controller 972 connected to a hard disk 968 and a floppy drive 970, a communication controller 974, for connection to the network 984 which can be for example, an Ethernet® network, an I/O controller 976 connected to an external hard disk 980 through a SCSI bus, for example, and a printer 978 connected through an RS-232 cable, for example. The workstation also contains a display controller 982 connected to a CRT 984. The system bus 966 connects the elements within the workstation.

The main features of the present invention have been illustrated in the drawings contained herein and described above. While the main features of the invention have been illustrated and described, some of the minor and trivial features of the invention have not been set forth in the present application. Using the known SPDL draft standard, the standards which are used within SPDL, and the disclosure of the present invention, it would be obvious for one of ordinary skill in the art to program a general purpose computer to embody the present invention.

Obviously, numerous modifications and variations of the present invention are possible in light of the above teachings. For example, data structures which are equivalent to the data structures described in the present application can be used in place of those data structures to achieve the same results as the above-described invention. For example, it is possible to implement a stack using linked list data structures. It is therefore to be understood that within the scope of the appended claims, the invention may be practiced otherwise than as specifically described herein.

What is claimed as new and desired to be secured by Letters Patent of the United States is:

1. A method for generating a hierarchically structured file, comprising the steps of:
   displaying a first plurality of elements for a user to select which may exist in said hierarchically structured file;
   inputting a selection of a first desired element;
   adding a line to said hierarchically structured file which corresponds to the first inputted selection to create said hierarchically structured file which conforms to requirements of a page description language;
   determining a second plurality of elements for the user to select using the first inputted selection;
   displaying the second plurality of elements for the user to select;
   inputting a selection of a second desired element; and
   adding a line, to said hierarchically structured file which corresponds to the second inputted selection to create said hierarchically structured file which conforms to the requirements of the page description language.

2. A method according to claim 1, wherein said steps of adding a line to said hierarchically structured file add lines to create a hierarchically structured file which conforms to SPDL requirements.

3. A method according to claim 1, wherein said step of inputting a selection of a second desired element comprises:
   inputting a selection of a second desired element by the user;
   querying the user to enter information of the second desired element; and
   inputting the information of the second desired element, wherein the step of adding a line to said hierarchically structured file which corresponds to the second inputted selection comprises:
   adding a line to said hierarchically structured file which corresponds to the second inputted selection and includes the information of the second desired element.

4. A method according to claim 3, wherein said step of inputting the information of the second desired element inputs information from the user describing features of the second desired element which has been selected.

5. A method according to claim 4, wherein said step of inputting the information of the second desired element inputs at least one of a name and a size.

6. A method according to claim 4, wherein said step of inputting the information of the second desired element inputs content information.

7. A method according to claim 6, wherein said step of inputting the information of the second desired element inputs content information which includes a token sequence element.

8. An apparatus for generating a hierarchically structured file, comprising:
   a first display means for displaying a first plurality of elements for a user to select which may exist in said hierarchically structured file;
   a first inputting means for inputting a selection of a first desired element;
   a first adding means for adding a line to said hierarchically structured file which corresponds to the first inputted selection to create said hierarchically structured file which conforms to requirements of a page description language;
   means for determining a second plurality of elements for a user to select using the first inputted selection;

a second display means for displaying the second plurality of elements for a user to select;

a second inputting means for inputting a selection of a second desired element; and a second adding means for adding a line to said hierarchically structured file which corresponds to the second inputted selection to create said hierarchically structured file which conforms to the requirements of a page description language.

9. An apparatus according to claim 8, wherein said first and second adding means add lines to said hierarchically structured file to form said hierarchically structured file as a file which conforms to SPDL requirements.

10. An apparatus according to claim 8, wherein said second inputting means comprises:

means for inputting a selection of a second desired element by the user;

means for querying the user to enter information of the second desired element; and means for inputting the information of the second desired element, wherein the second adding means comprises:

means for adding a line to said hierarchically structured file which corresponds to the second inputted selection and includes the information of the second desired element.

11. An apparatus according to claim 10, wherein said means for inputting the information of the second desired element inputs information from the user describing features of the second desired element which has been selected.

12. An apparatus according to claim 11, wherein said means for inputting the information of the second desired element inputs at least one of a name and a size.

13. An apparatus according to claim 11, wherein said means for inputting the information of the second desired element inputs content information.

14. An apparatus according to claim 13, wherein said means for inputting the information of the second desired element inputs content information which includes a token sequence element.

15. A method for generating a file which conforms to hierarchical rules, comprising the steps of:

displaying a first plurality of elements for a user to select;

inputting a first selection of a first desired element, the first selection corresponding to a first predetermined position in a hierarchy of elements which can appear in said file which follows the hierarchical rules;

adding a line, to said file, which corresponds to the first inputted selection;

pushing an entry onto a stack means which corresponds to the first inputted selection;

determining a second plurality of elements for the user to select using the first inputted selection and the hierarchical rules;

displaying the second plurality of elements for the user to select;

inputting a second selection of a second desired line, the second selection corresponding to an element which is below the element of the first selection in the hierarchical rules;

pushing an entry onto the stack which corresponds to the second inputted selection;

popping the entry out of the stack which corresponds to the second inputted selection; and popping the entry out of the stack which corresponds to the first inputted selection.

16. A method according to claim 15, wherein said step of inputting a second selection comprises:

inputting a second selection of a desired element by the user;

querying the user to enter information of the desired element; and inputting the information of the desired element, said method further comprising the step of:

adding the second desired line to said file which corresponds to the second inputted selection and includes the information of the desired element.

17. A method according to claim 16, wherein said step of inputting the information of the desired element from the user inputs information describing features of the desired element.

18. A method according to claim 17, wherein said step of inputting the information of the desired element inputs at least one of a name and a size.

19. A method according to claim 17, wherein said step of inputting the information of the desired element inputs content information.

20. A method according to claim 19, wherein said step of inputting the information of the desired element inputs content information which includes a token sequence element.

21. An apparatus for generating a file which conforms to hierarchical rules, comprising:

means for displaying a first plurality of elements for a user to select;

means for inputting a first selection of a first desired element, the first selection corresponding to a first predetermined position in a hierarchy of elements which can appear in said file which follows the hierarchical rules;

means for adding a line, to said file, which corresponds to the first inputted selection;

means for pushing an entry onto a stack means which corresponds to the first inputted selection;

means for determining a second plurality of elements for the user to select using the first inputted selection and the hierarchical rules;

means for displaying the second plurality of elements for the user to select;

means for inputting a second selection of a second desired line, the second selection corresponding to an element which is below the element of the first selection in the hierarchical rules;

means for pushing an entry onto the stack which corresponds to the second inputted selection;

means for popping the entry out of the stack which corresponds to the second inputted selection; and means for popping the entry out of the stack which corresponds to the first inputted selection.

22. An apparatus according to claim 21, wherein said means for inputting a second selection comprises:

means for inputting a second selection of a desired element by the user;

means for querying the user to enter information of the desired element; and means for inputting the information of the desired element, said apparatus further comprising:

means for adding the second desired line to said file which corresponds to the second inputted selection and includes the information of the desired element.

23. An apparatus according to claim 22, wherein said means for inputting the information of the desired element from the user inputs information describing features of the desired element.

24. An apparatus according to claim 23, wherein said means for inputting the information of the desired element inputs content information.

25. An apparatus according to claim 24, wherein said means for inputting the information of the desired element inputs content information which includes a token sequence element.

26. An apparatus according to claim 23, wherein said means for inputting the information of the desired element inputs at least one of a name and a size.

27. A method for generating a file, comprising the steps of:

displaying a first plurality of elements for a user to select;

inputting a first selection of a desired element, the first selection corresponding to a first predetermined position in a hierarchy of elements which can appear in said file;

adding a line, to said-file, which corresponds to the first inputted selection;

pushing an entry onto a stack which corresponds to the first inputted selection at a first predetermined hierarchical level;

popping off the entry on the stack which corresponds to the first inputted selection and adding a line to said file which indicates an end of the first inputted selection when the first predetermined hierarchical level ends;

determining a second plurality of elements for the user to select using the first inputted selection and said hierarchy of elements;

displaying the second plurality of elements for the user to select;

inputting a second selection of a second desired element, the second selection corresponding to an element which is below the element of the first selection in said hierarchy of elements;

adding a line, to said file, which corresponds to the second inputted selection at a second predetermined hierarchical level;

pushing an entry onto the stack which corresponds to the second inputted selection;

popping off the entry on the stack which corresponds to the second inputted selection and adding a line to said file which indicates an end of the second inputted selection when the second predetermined hierarchical level ends.

28. An apparatus for generating a file, comprising:

means for displaying a first plurality of elements for a user to select;

means for inputting a first selection of a desired element, the first selection corresponding to a first predetermined position in a hierarchy of elements which can appear in said file;

means for adding a line, to said file, which corresponds to the first inputted selection;

means for pushing an entry onto a stack which corresponds to the first inputted selection at a first predetermined hierarchical level;

means for popping off the entry on the stack which corresponds to the first inputted selection and adding a line to said file which indicates an end of the first inputted selection when the first predetermined hierarchical level ends;

means for determining a second plurality of elements for the user to select using the first inputted selection and said hierarchy of elements;

means for displaying the second plurality of elements for the user to select;

means for inputting a selection of a second desired element, the selection of the second desired element corresponding to an element which is below the element of the first selection in said hierarchy of elements;

means for adding a line, to said file, which corresponds to the inputted selection of the second desired element at a second predetermined hierarchical level;

means for pushing an entry onto the stack which corresponds to the inputted selection of the second desired element;

means for popping off the entry on the stack which corresponds to the inputted selection of the second desired element and adding a line to said file which indicates an end of the inputted selection of the second desired element when the second predetermined hierarchical level ends.

29. A method for generating a file, comprising the steps of:

inputting a reference to a line of a previously created file;

determining a first plurality of lines for a generated file using said inputted reference and the previously created file;

determining a first plurality of elements for a user to select using said previously created file and said inputted reference;

displaying the first plurality of elements for the user to select;

inputting a selection of a first element;

adding a line which corresponds to the first inputted selection to said generated file after the first plurality of elements;

determining a second plurality of elements for a user to select using the first inputted selection;

displaying the second plurality of elements for the user to select;

inputting a selection of a second element; and adding a line to said generated file which corresponds to the inputted selection of the second element, after the line which corresponds to the inputted selection of the first element.

30. An apparatus for generating a file, comprising:

means for inputting a reference to a line of a previously created file;

means for determining a first plurality of lines for a generated file using said inputted reference and the previously created file;

means for determining a first plurality of elements for a user to select using said previously created file and said inputted reference;

means for displaying the first plurality of elements for the user to select;

means for inputting a selection of a first element;

means for adding a line which corresponds to the first inputted selection to said generated file after the first plurality of elements;

means for determining a second plurality of elements for a user to select using the first inputted selection;

means for displaying the second plurality of elements for the user to select;

means for inputting a selection of a second element; and means for adding a line to said generated file which corresponds to the inputted selection of the second element, after the line which corresponds to the inputted selection of the first element.

* * * * *